United States Patent
Kitano et al.

(10) Patent No.: US 10,926,479 B2
(45) Date of Patent: Feb. 23, 2021

(54) VACUUM-SEALING DEVICE AND METHOD FOR OPERATING VACUUM-SEALING DEVICE

(71) Applicant: Panasonic Intellectual Property Management Co., Ltd., Osaka (JP)

(72) Inventors: Tomoaki Kitano, Shiga (JP); Hideji Kawarazaki, Osaka (JP); Toshiaki Hirano, Shiga (JP); Masayuki Miyahigashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 187 days.

(21) Appl. No.: 16/030,347

(22) Filed: Jul. 9, 2018

(65) Prior Publication Data

US 2018/0319088 A1 Nov. 8, 2018

Related U.S. Application Data

(63) Continuation of application No. PCT/JP2017/008066, filed on Mar. 1, 2017.

(30) Foreign Application Priority Data

Mar. 2, 2016 (JP) .............................. JP2016-040301

(51) Int. Cl.
*B29C 65/02* (2006.01)
*F16L 59/065* (2006.01)
(Continued)

(52) U.S. Cl.
CPC ........ *B29C 65/02* (2013.01); *B29C 66/00145* (2013.01); *B29C 66/474* (2013.01);
(Continued)

(58) Field of Classification Search
CPC . B29L 2031/712; B29C 66/474; B29C 65/02; B29C 66/00145; F16L 59/065; F25D 2201/14
See application file for complete search history.

(56) References Cited

U.S. PATENT DOCUMENTS

| 3,156,975 A | 11/1964 | Wharton |
| 2015/0140244 A1 | 5/2015 | Uekado et al. |

FOREIGN PATENT DOCUMENTS

| FR | 917757 A | 1/1947 |
| JP | 56-040909 U | 4/1981 |

(Continued)

OTHER PUBLICATIONS

Machine translation of JP2012181991; Publication Sep. 20, 2012; Inventor Nakagawa Yasuhiko.*

(Continued)

*Primary Examiner* — Vishal I Patel
(74) *Attorney, Agent, or Firm* — Hamre, Schumann, Mueller & Larson, P.C.

(57) ABSTRACT

A vacuum-sealing device includes external cylinder part (501B) which includes a distal end face that is brought into airtight contact with an outer face of a container that is a vacuum-sealing target to cover an exhaust hole of the container, and includes body part (501A) provided within external cylinder part (501B) and movable forward and backward along an axial center of external cylinder part (501B). The vacuum-sealing device further includes driver (503) that moves external cylinder part (501B) and body part (501A) forward and backward in the direction of extension of the axial center of external cylinder part (501B), and heater (504) that heats distal end portion (51) of body part (501A). Exhaust space (58) communicating with the distal end face of external cylinder part (501B) is formed between an outer circumferential face of distal end portion (51) of body part (501A) and an inner circumferential face of external cylinder part (501B).

4 Claims, 26 Drawing Sheets

(51) Int. Cl.
 *B29C 65/00* (2006.01)
 *B29L 31/00* (2006.01)
(52) U.S. Cl.
 CPC ....... *F16L 59/065* (2013.01); *B29L 2031/712* (2013.01); *F25D 2201/14* (2013.01)

(56) References Cited

FOREIGN PATENT DOCUMENTS

| | | |
|---|---|---|
| JP | 1-124519 | 5/1989 |
| JP | 9-092115 | 4/1997 |
| JP | 9-092115 A | 4/1997 |
| JP | 2000-149791 | 5/2000 |
| JP | 2012-181991 A | 9/2012 |
| JP | 2013-023229 | 2/2013 |
| JP | 5310928 B | 10/2013 |
| JP | 2015-000731 A | 1/2015 |
| WO | 2015/145419 A1 | 10/2015 |

OTHER PUBLICATIONS

Machine translation of JP 2012-181991 A; Publication date: Sep. 20, 2012.*
The Extended European Search Report dated Feb. 22, 2019 for the related European Patent Application No. 17760061.6., 9 pages.

* cited by examiner

VACUUM-SEALING DEVICE AND METHOD FOR OPERATING VACUUM-SEALING DEVICE

TECHNICAL FIELD

The present disclosure relates to a vacuum-sealing device and a method for operating a vacuum-sealing device.

BACKGROUND ART

A vacuum-sealing device conventionally known as a device which performs vacuum-sealing to manufacture a vacuum heat insulator contained in a refrigerator or other apparatuses includes a chamber container capable of reducing a pressure inside the chamber container, and a sealing device which seals an opening portion of an exterior covering by thermal welding within the chamber container (for example, see PTL 1).

According to the vacuum-sealing device disclosed in PTL 1, a material which is a sealing target and has a core material inside a bag-shaped exterior covering is placed within a chamber container. Subsequently, a pressure inside the chamber container is reduced. In this condition, the sealing device is driven to seal an opening portion of the material to be sealed. As a result, the core material is sealed into the external covering under a reduced pressure to manufacture a vacuum heat insulating material.

According to the vacuum-sealing device disclosed in PTL 1, however, the chamber container needs to be larger in size to manufacture a vacuum heat insulating material included in a large-scale apparatus such as a refrigerator. With enlargement of the chamber container in size, a longer time is required to reduce a pressure of an inner space to a desired pressure. Accordingly, manufacturing costs of the vacuum heat insulating material increase.

PTL 2 discloses open-cell urethane foam constituting a core material of a vacuum heat insulator.

CITATION LIST

Patent Literature

PTL 1: Unexamined Japanese Patent Publication No. 2013-23229

PTL 2: Japanese Patent No. 5310928

SUMMARY OF THE INVENTION

The present disclosure provides a vacuum-sealing device and a method for operating a vacuum-sealing device, the device and the method being capable of manufacturing a vacuum heat insulator even included in a large-scale apparatus without a need of a large-sized chamber container, and capable of reducing manufacturing costs while securing sufficient gas-barrier and heat insulation properties of the vacuum heat insulator.

More specifically, a vacuum-sealing device according to an exemplary embodiment of the present disclosure presented by way of example is a vacuum-sealing device configured to seal an exhaust hole by a sealing member. The exhaust hole is formed in a container that is a vacuum-sealing target. The vacuum-sealing device includes a body unit that includes an external cylinder part and a body part. The external cylinder part includes a distal end face that is brought into contact with an outer face of the container to cover the exhaust hole of the container. The body part is provided within the external cylinder part and movable forward and backward along an axial center of the external cylinder part. The vacuum-sealing device according to the exemplary embodiment of the present disclosure presented by way of example further includes a driver that moves the external cylinder part and the body part forward and backward in the direction of extension of the axial center of the external cylinder part, and a heater that heats at least a part of the body part.

According to the vacuum-sealing device in the exemplary embodiment of the present disclosure presented by way of example, the body part includes a distal end portion heated by the heater, and an exhaust channel that includes an opening formed at the distal end portion. An exhaust space communicating with the distal end face of the external cylinder part is formed between an outer circumferential face of the distal end portion of the body part and an inner circumferential face of the external cylinder part. According to the vacuum-sealing device in the exemplary embodiment of the present disclosure presented by way of example, the sealing member is configured to be attracted to and held by the distal end portion of the body part by exhaust of air via the exhaust channel.

This configuration eliminates a necessity of providing a means for fixing the sealing member to the distal end portion of the body unit, such as an adhesive. Accordingly, reduction of manufacturing costs of the vacuum-sealing device is achievable. Moreover, an adhesive for fixing the sealing member does not remain on an outer face or other places of the container (gas barrier container) of the vacuum heat insulator that is a vacuum-sealing target. Accordingly, no clearance is produced between the outer face of the container and an inner face of an inner box of the vacuum heat insulator. Accordingly, sufficient gas barrier and heat insulation properties of a heat insulation device are securable. Furthermore, this configuration can efficiently and securely seal the exhaust hole formed in the vacuum heat insulator that is a vacuum-sealing target. Accordingly, reduction of manufacturing costs of the vacuum-sealing device is achievable while securing sufficient gas barrier and heat insulation properties of the vacuum heat insulator or the like that is a vacuum-sealing target without a necessity of enlarging a chamber container in size.

The vacuum-sealing device according to the exemplary embodiment of the present disclosure presented by way of example may further include the body unit constituted by the external cylinder part and the body part, a vacuum pump connected to the exhaust space and the exhaust channel, and a controller. In this case, the controller may be configured to operate the vacuum pump to attract the sealing member to the distal end portion of the body part. The controller may be further configured to operate the driver to shift the external cylinder part toward the container and bring the distal end face of the external cylinder part into contact with the outer face of the container such that the distal end face of the external cylinder part covers the exhaust hole of the container. The controller may be further configured to operate the vacuum pump to exhaust air from an interior of the container via the exhaust space. The controller may be further configured to operate the driver to move the body unit such that the sealing member closes the exhaust hole. The controller may be further configured to operate the heater to heat the distal end portion of the body part and weld the sealing member to a circumferential edge of the exhaust hole formed in the container.

This configuration eliminates the necessity of providing a means for fixing the sealing member to the distal end portion of the body, such as an adhesive. Accordingly, reduction of manufacturing costs of the vacuum-sealing device is achievable. Moreover, an adhesive for fixing the sealing member does not remain on the outer face or other places of the gas barrier container of the vacuum heat insulator that is a vacuum-sealing target. Accordingly, no clearance is produced between the outer face of the gas barrier container and the inner face of the inner box. This configuration can secure sufficient gas barrier and heat insulation properties of the vacuum heat insulator vacuum-sealed by the vacuum-sealing device according to the exemplary embodiment of the present disclosure presented by way of example, and a heat insulation device including this vacuum heat insulator. Furthermore, this configuration can efficiently and securely seal the exhaust hole formed in the vacuum heat insulator that is a vacuum-sealing target without a necessity of enlarging a chamber container in size. Accordingly, this configuration achieves reduction of manufacturing costs of the vacuum-sealing device while securing sufficient gas barrier and heat insulation properties of the vacuum heat insulator manufactured and vacuum-sealed by the vacuum-sealing device according to the exemplary embodiment of the present disclosure presented by way of example, and the heat insulation device including the vacuum heat insulator.

The vacuum-sealing device according to the exemplary embodiment of the present disclosure presented by way of example may further include a first exhaust channel that connects the exhaust space and the vacuum pump, and a second exhaust channel that connects the exhaust channel of the body part and the first exhaust channel. In this case, the first exhaust channel may be configured such that a cross-sectional area of the first exhaust channel becomes larger than a cross-sectional area of the second exhaust channel.

This configuration can increase a flow rate of air flowing in the first exhaust channel to a flow rate larger than a flow rate of air flowing in the second exhaust channel. Accordingly, exhaust of air from the interior of the gas barrier container (first member) that is a vacuum-sealing target is more rapidly achievable. This configuration therefore provides a vacuum-sealing device capable of achieving more efficient and securer vacuum sealing.

The vacuum-sealing device according to the exemplary embodiment of the present disclosure presented by way of example is configured to seal an exhaust hole formed in a container that is a vacuum-sealing target. The exhaust hole is sealed by dissolving a boss provided at a circumferential edge of the exhaust hole. The vacuum-sealing device may be configured as follows. The vacuum-sealing device includes a body unit that includes an external cylinder part and a body part. The external cylinder part includes a distal end face that is brought into airtight contact with an outer face of the container to cover the exhaust hole. The body part is provided within the external cylinder part and movable forward and backward along an axial center of the external cylinder part. The vacuum-sealing device according to the exemplary embodiment of the present disclosure presented by way of example may further include a driver that moves the external cylinder part and the body part forward and backward in the direction of extension of the axial center of the external cylinder part, a heater that heats at least a part of the body part, and a controller.

According to the vacuum-sealing device in the exemplary embodiment of the present disclosure presented by way of example, the body part may include a distal end portion heated by a heating unit. An exhaust space communicating with the distal end face of the external cylinder part may be formed between an outer circumferential face of the distal end portion of the body part and an inner circumferential face of the external cylinder part.

The vacuum-sealing device according to the exemplary embodiment of the present disclosure presented by way of example may further include a vacuum pump connected to the exhaust space.

According to the vacuum-sealing device in the exemplary embodiment of the present disclosure presented by way of example, the controller may be configured to operate the driver to shift the external cylinder part toward the container that is a vacuum-sealing target, and bring the distal end face of the external cylinder part into contact with the outer face of the container that is a vacuum-sealing target such that the distal end face of the external cylinder part covers the exhaust hole of the container. The controller may be further configured to operate the vacuum pump to exhaust air via the exhaust space from an interior of the container that is a vacuum-sealing target. The controller may be further configured to operate the driver to move the body unit such that the distal end portion of the body part is brought into contact with the boss of the container that is a vacuum-sealing target. The controller may be further configured to operate the heater to heat the distal end portion of the body part and dissolve the boss for seal of the exhaust hole of the container that is a vacuum-sealing target.

This configuration can efficiently and securely seal the exhaust hole formed in the vacuum heat insulator that is a vacuum-sealing target without necessities of using a sealing member, and enlarging a chamber container in size. Accordingly, this configuration achieves reduction of manufacturing costs of the vacuum-sealing device while securing sufficient gas barrier and heat insulation properties of the vacuum heat insulator manufactured and vacuum-sealed by the vacuum-sealing device according to the exemplary embodiment of the present disclosure presented by way of example, and a heat insulation device including this vacuum heat insulator.

The vacuum-sealing device according to the exemplary embodiment of the present disclosure presented by way of example is configured to seal an exhaust hole by a sealing member. The exhaust hole is formed in a container that is a vacuum-sealing target. The vacuum-sealing device may be configured as follows. The vacuum-sealing device includes a body unit that includes an external cylinder part and a body part. The external cylinder part includes a distal end face that is brought into airtight contact with an outer face of the container to cover the exhaust hole of the container that is a vacuum-sealing target. The body part is provided within the external cylinder part and movable forward and backward along an axial center of the external cylinder part. The vacuum-sealing device according to the exemplary embodiment of the present disclosure presented by way of example may further include a driver that moves the external cylinder part and the body part forward and backward in the direction of extension of the axial center of the external cylinder part, a heater that heats at least a part of the body part, and a controller.

According to the vacuum-sealing device in the exemplary embodiment of the present disclosure presented by way of example, the body part may include a distal end portion heated by the heating unit. An exhaust space communicating with the distal end face of the external cylinder part may be formed between an outer circumferential face of the distal end portion of the body part and an inner circumferential face of the external cylinder part.

The vacuum-sealing device according to the exemplary embodiment of the present disclosure presented by way of example may further include a vacuum pump connected to the exhaust space.

According to the vacuum-sealing device in the exemplary embodiment of the present disclosure presented by way of example, the controller may be configured to operate the driver to shift the external cylinder part toward the container that is a vacuum-sealing target, and bring the distal end face of the external cylinder part into contact with the outer face of the container carrying the sealing member such that the distal end face of the external cylinder part covers the exhaust hole formed in the container that is a vacuum-sealing target. The controller may be further configured to operate the vacuum pump to exhaust air via the exhaust space from an interior of the container that is a vacuum-sealing target. The controller may be further configured to operate the driver to move the body unit such that the distal end portion of the body part presses the sealing member. The controller may be further configured to operate the heater to heat the distal end portion of the body part and weld the sealing member to a circumferential edge of the exhaust hole formed in the container that is a vacuum-sealing target.

This configuration eliminates a necessity of providing a means for fixing the sealing member to the distal end portion of the body part, such as an adhesive. Accordingly, reduction of manufacturing costs of the vacuum-sealing device is achievable.

Moreover, according to this configuration, an adhesive does not remain on the outer face of the sealing member after the exhaust hole of the container that is a vacuum-sealing target is sealed by the sealing member. In this case, no clearance is produced between the outer face of the gas barrier container of the vacuum heat insulator that is a vacuum-sealing target, and an inner face of an inner box of the vacuum heat insulator. Accordingly, a heat insulation wall which includes the vacuum heat insulator including the container manufactured by the vacuum-sealing device in the exemplary embodiment of the present disclosure presented by way of example can secure sufficient gas barrier and heat insulation properties. The vacuum-sealing device according to the exemplary embodiment of the present disclosure presented by way of example therefore provides a heat insulation device which includes a heat insulation wall securing sufficient gas barrier and heat insulation properties.

Moreover, according to the vacuum-sealing device in the exemplary embodiment of the present disclosure presented by way of example, the body part does not include an exhaust channel. In this case, the exhaust hole can be sealed by a simpler configuration. Accordingly, reduction of manufacturing costs of the vacuum-sealing device is achievable. Furthermore, this configuration can efficiently and securely seal the exhaust hole formed in the vacuum heat insulator that is a vacuum-sealing target without a necessity of a large-sized chamber container. Accordingly, this configuration achieves reduction of manufacturing costs of the vacuum-sealing device while securing sufficient gas barrier and heat insulation properties of the vacuum heat insulator vacuum-sealed by the vacuum-sealing device according to the exemplary embodiment of the present disclosure presented by way of example, and the heat insulation device including the vacuum heat insulator.

A method for operating a vacuum-sealing device according to an exemplary embodiment of the present disclosure presented by way of example is a method for operating a vacuum-sealing device configured to seal an exhaust hole by a sealing member. The exhaust hole is formed in a container that is a vacuum-sealing target. The vacuum-sealing device may be configured as follows. The vacuum-sealing device includes a body unit that includes an external cylinder part and a body part. The external cylinder part includes a distal end face that is brought into airtight contact with an outer face of the container that is a vacuum-sealing target to cover the exhaust hole of the container. The body part is provided within the external cylinder part and movable forward and backward along an axial center of the external cylinder part. According to the method for operating the vacuum-sealing device in the exemplary embodiment of the present disclosure presented by way of example, the body part of the vacuum-sealing device may include a distal end portion. An exhaust space communicating with the distal end face of the external cylinder part may be formed between an outer circumferential face of the distal end portion of the body part and an inner circumferential face of the external cylinder part. The body part may further include an exhaust channel that includes an opening formed at the distal end portion.

According to the method for operating the vacuum-sealing device in the exemplary embodiment of the present disclosure presented by way of example, the vacuum-sealing device may further include a driver that moves the external cylinder part and the body part forward and backward in the direction of extension of the axial center of the external cylinder part, a heater that heats the distal end portion of the body part, and a vacuum pump connected to the exhaust space and the exhaust channel.

The method for operating the vacuum-sealing device according to the exemplary embodiment of the present disclosure presented by way of example may include operating the vacuum pump to attract the sealing member to the distal end portion of the body part, and operating the driver to shift the external cylinder part toward the container that is a vacuum-sealing target, and bring the distal end face of the external cylinder part into contact with the outer face of the container such that the distal end face of the external cylinder part covers the exhaust hole of the container. The method for operating the vacuum-sealing device according to the exemplary embodiment of the present disclosure presented by way of example may include operating the vacuum pump to exhaust air via the exhaust space from an interior of the container that is a vacuum-sealing target, and operating the driver to move the body unit toward the container that is a vacuum-sealing target such that the sealing member closes the exhaust hole. The method for operating the vacuum-sealing device according to the exemplary embodiment of the present disclosure presented by way of example may include operating the heater to heat the distal end portion of the body part and weld the sealing member to a circumferential edge of the exhaust hole formed in the container that is a vacuum-sealing target.

This method can seal the exhaust hole formed in the vacuum heat insulator that is a vacuum-sealing target without using an adhesive or the like for fixing the sealing member to the distal end portion of the body unit. In this case, an adhesive for fixing the sealing member does not remain on an outer face or other places of a gas barrier container of the vacuum heat insulator that is a vacuum-sealing target. Accordingly, no clearance is produced between an outer face of the gas barrier container and an inner face of an inner box. Accordingly, this method can manufacture a vacuum heat insulator or the like which secures sufficient gas barrier and heat insulation properties without a necessity of enlarging a chamber container in size, and therefore can achieve reduction of manufacturing costs.

According to the method for operating the vacuum-sealing device in the exemplary embodiment of the present disclosure presented by way of example, the vacuum-sealing device may further include a first exhaust channel that connects the exhaust space and the vacuum pump, and a second exhaust channel that connects the exhaust channel of the body part and the first exhaust channel. In this case, the first exhaust channel may be configured such that a cross-sectional area of the first exhaust channel becomes larger than a cross-sectional area of the second exhaust channel.

This configuration can increase a flow rate of air flowing in the first exhaust channel to a flow rate larger than a flow rate of air flowing in the second exhaust channel. Accordingly, exhaust of air from the interior of the container (first member) that is a vacuum-sealing target is more rapidly achievable. This configuration therefore provides a vacuum-sealing device capable of achieving more efficient and securer vacuum sealing.

According to the method for operating the vacuum-sealing device in the exemplary embodiment of the present disclosure presented by way of example, the vacuum-sealing device is configured to seal an exhaust hole formed in a container that is a vacuum-sealing target. The exhaust hole is sealed by dissolving a boss provided at a circumferential edge of the exhaust hole. The vacuum-sealing device may be configured as follows. The vacuum-sealing device includes a body unit that includes an external cylinder part and a body part. The external cylinder part includes a distal end face that is brought into airtight contact with an outer face of the container that is a vacuum-sealing target to cover the exhaust hole formed in the container that is a vacuum-sealing target. The body part is provided within the external cylinder part and movable forward and backward along an axial center of the external cylinder part. According to the method for operating the vacuum-sealing device in the exemplary embodiment of the present disclosure presented by way of example, the body part of the vacuum-sealing device may include a distal end portion. An exhaust space communicating with the distal end face of the external cylinder part may be formed between an outer circumferential face of the distal end portion of the body part and an inner circumferential face of the external cylinder part. According to the method for operating the vacuum-sealing device in the exemplary embodiment of the present disclosure presented by way of example, the vacuum-sealing device may further include a driver that moves the external cylinder part and the body part forward and backward in the direction of extension of the axial center of the external cylinder part, and a heater that heats the distal end portion of the body part.

The method for operating the vacuum-sealing device according to the exemplary embodiment of the present disclosure presented by way of example may include operating the driver to shift the external cylinder part toward the container that is a vacuum-sealing target, and bring the distal end face of the external cylinder part into contact with the outer face of the container that is a vacuum-sealing target such that the distal end face of the external cylinder part covers the exhaust hole of the container that is a vacuum-sealing target, and operating the vacuum pump to exhaust air via the exhaust space from an interior of the container that is a vacuum-sealing target. The method for operating the vacuum-sealing device according to the exemplary embodiment of the present disclosure presented by way of example may further include operating the driver to move the body unit toward the container that is a vacuum-sealing target such that the distal end portion of the body part is brought into contact with the boss of the container, and operating the heater to heat the distal end portion of the body part and dissolve the boss for seal of the exhaust hole of the container.

This method can efficiently and securely seal the exhaust hole formed in the vacuum heat insulator that is a vacuum-sealing target without necessities of using a sealing member, and enlarging a chamber container in size. This configuration therefore provides such a vacuum-sealing device capable of reducing manufacturing costs while securing sufficient gas barrier and heat insulation properties of a vacuum heat insulator that is a vacuum-sealing target, and a heat insulation device including this vacuum heat insulator.

The method for operating a vacuum-sealing device according to the exemplary embodiment of the present disclosure presented by way of example is a method for operating a vacuum-sealing device. The vacuum-sealing device is configured to seal an exhaust hole by a sealing member. The exhaust hole is formed in a container that is a vacuum-sealing target. The vacuum-sealing device may be configured as follows. The vacuum-sealing device includes a body unit that includes an external cylinder part and a body part. The external cylinder part includes a distal end face that is brought into airtight contact with an outer face of the container that is a vacuum-sealing target to cover the exhaust hole of the container that is a vacuum-sealing target. The body part is provided within the external cylinder part and movable forward and backward along an axial center of the external cylinder part.

According to the method for operating the vacuum-sealing device in the exemplary embodiment of the present disclosure presented by way of example, the vacuum-sealing device may further include a driver that moves the external cylinder part and the body part forward and backward in the direction of the axial center of the external cylinder part, and a heater that heats at least a part of the body part.

According to the method for operating the vacuum-sealing device in the exemplary embodiment of the present disclosure presented by way of example, the body part of the vacuum-sealing device may include a distal end portion heated by the heater. An exhaust space communicating with the distal end face of the external cylinder part may be formed between an outer circumferential face of the distal end portion and an inner circumferential face of the external cylinder part.

According to the method for operating the vacuum-sealing device according to the exemplary embodiment of the present disclosure presented by way of example, the vacuum-sealing device may further include a vacuum pump connected to the exhaust space.

The method for operating the vacuum-sealing device according to the exemplary embodiment of the present disclosure presented by way of example may include placing the sealing member at a circumferential edge of the exhaust hole of the container that is a vacuum-sealing target such that the sealing member covers the exhaust hole of the container that is a vacuum-sealing target, and operating the driver to shift the external cylinder part toward the container that is a vacuum-sealing target, and bring the distal end face of the external cylinder part into contact with the outer face of the container such that the distal end face of the external cylinder part covers the exhaust hole of the container.

The method for operating the vacuum-sealing device according to the exemplary embodiment of the present disclosure presented by way of example may further include operating the vacuum pump to exhaust air via the exhaust space from an interior of the container that is a vacuum-sealing target, and operating the driver to move the body unit such that the distal end portion of the body part presses the sealing member.

The method for operating the vacuum-sealing device according to the exemplary embodiment of the present disclosure presented by way of example may further include operating the heater to heat the distal end portion of the body part and weld the sealing member to a circumferential edge of the exhaust hole formed in the container that is a vacuum-sealing target.

This method can efficiently and securely seal the exhaust hole formed in the vacuum heat insulator that is a vacuum-sealing target, thereby achieving reduction of manufacturing costs of the vacuum-sealing device while securing sufficient gas barrier and heat insulation properties.

This method further eliminates a necessity of providing a means for fixing the sealing member to the distal end portion of the body part, such as an adhesive. Accordingly, reduction of manufacturing costs of the vacuum-sealing device is achievable.

Moreover, according to this method, an adhesive does not remain on the outer face of the sealing member after the exhaust hole of the container that is a vacuum-sealing target is sealed by the sealing member. In this case, no clearance is produced between an outer face of a gas barrier container of the vacuum heat insulator that is a vacuum-sealing target, and an inner face of an inner box of the vacuum heat insulator. Accordingly, a heat insulation wall including a vacuum heat insulator manufactured by this method, and a heat insulation device including this heat insulation wall can secure sufficient gas barrier and heat insulation properties.

Moreover, according to the method for operating the vacuum-sealing device in the exemplary embodiment of the present disclosure presented by way of example, the body part of the vacuum-sealing device does not include an exhaust channel. In this case, the exhaust hole can be sealed by a simpler configuration. Accordingly, reduction of manufacturing costs of the vacuum-sealing device is achievable.

DESCRIPTION OF EMBODIMENTS

Figure 1:
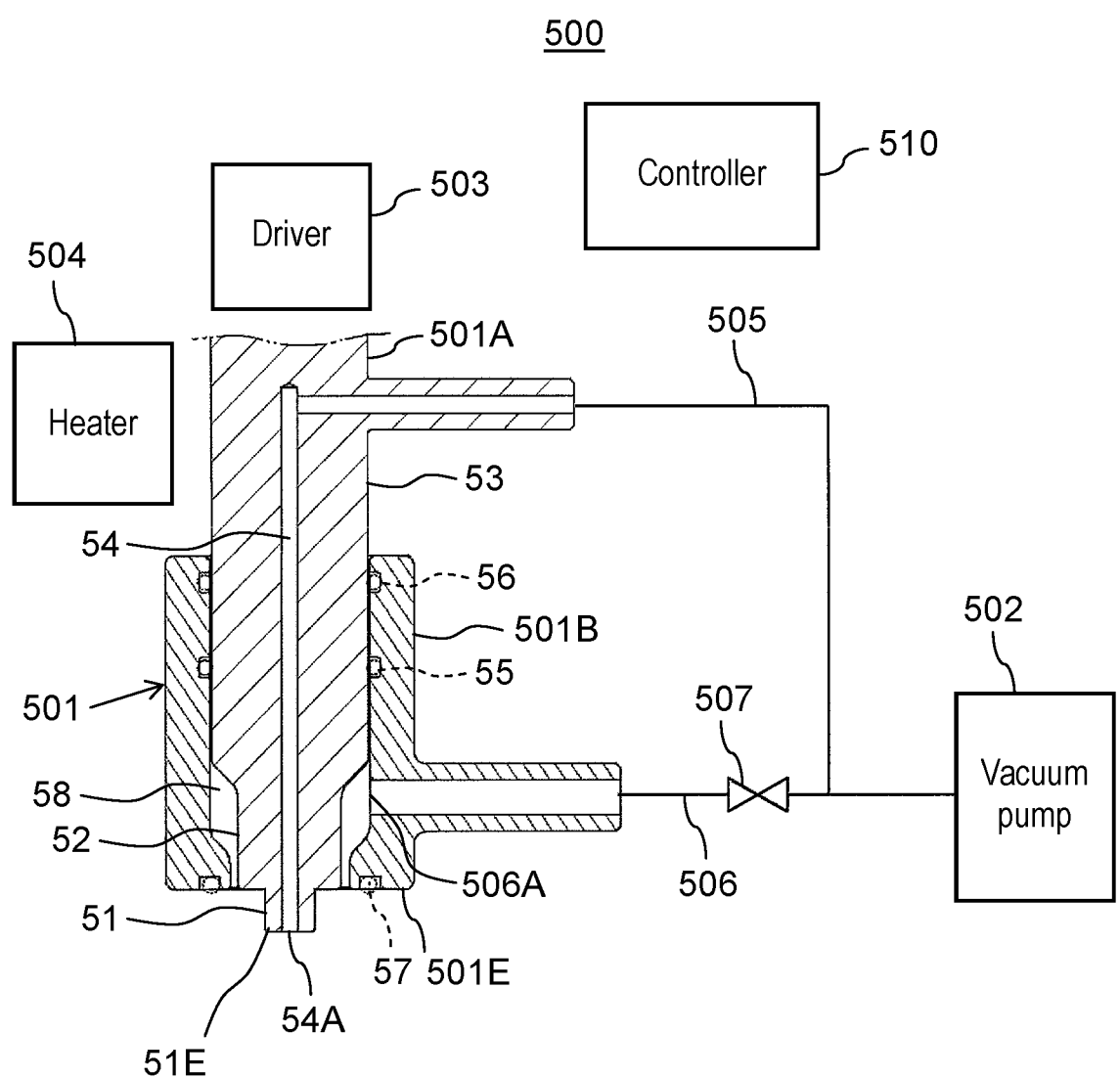
FIG. 1 is a schematic view illustrating a general configuration of a vacuum-sealing device according to a first exemplary embodiment of the present disclosure.

Exemplary embodiments according to the present disclosure are hereinafter described with reference to the drawings. Identical or similar parts are given identical reference numbers in the drawings. Omission of the same description may be made. In addition, only a part of constituent elements for describing the present invention may be depicted in the drawings, while depiction of other constituent elements may be omitted. It is not intended that the present invention be limited to the following exemplary embodiments.

First Exemplary Embodiment

An example of a vacuum-sealing device according to a first exemplary embodiment of the present disclosure is hereinafter described with reference to FIGS. 1 to 16.
[Configuration of Vacuum-Sealing Device]

FIG. 1 is a schematic view illustrating a general configuration of a vacuum-sealing device according to the first exemplary embodiment of the present disclosure.

As illustrated in FIG. 1, vacuum-sealing device 500 includes vacuum-sealing device body unit (body unit) 501, vacuum pump 502, driver 503, heater 504, and controller 510. Body unit 501 includes body part 501A which has a substantially cylindrical shape and includes a step portion, and external cylinder part 501B which has a substantially cylindrical shape and includes a hollow portion. Body unit 501 is configured such that each of body part 501A and external cylinder part 501B is independently movable forward and backward by driver 503 along an axial center of external cylinder part 501B (hereinafter also referred to as axial center direction) (up-down direction in the present exemplary embodiment). It is assumed in the present disclosure that a direction for moving toward a container which is a vacuum-sealing target (gas barrier container 402) described below in the direction of extension of the axial center of external cylinder part 501B corresponds to a forward direction, and that a direction for moving away from the container corresponds to a backward direction during forward and backward movement.

Vacuum-sealing device 500 may be attached to an arm tip of a robot device (not shown).

Body part 501A includes distal end portion 51, intermediate portion 52, and rear end portion 53. Body part 501A is configured such that an area of a transverse section (cross section cut in horizontal direction) decreases by stages in a direction from rear end portion 53 toward distal end portion 51. Moreover, exhaust channel 54 extending from distal end portion 51 (distal end face 51E of body part 501A) to rear end portion 53 is formed inside body part 501A. Exhaust channel 54 is connected to first exhaust channel 506 described below via second exhaust channel 505 provided outside body part 501A. Opening 54A provided at distal end portion 51 constitutes an end of exhaust channel 54.

External cylinder part 501B is disposed in such a position as to surround an outer circumferential face of body part 501A. External cylinder part 501B is configured such that an inner circumferential face of external cylinder part 501B slides on an outer circumferential face of rear end portion 53 of body part 501A. More specifically, sealing members 55, 56 each having an annular shape are disposed on an inner circumferential face included in external cylinder part 501B and facing rear end portion 53 with a space left between sealing members 55, 56 in the up-down direction. Each of sealing members 55, 56 may be constituted by an O-ring, for example.

A recess having an annular shape is further formed in distal end face 501E (lower end face) of external cylinder part 501B. Sealing member 57 is disposed in this recess. Sealing member 57 may be constituted by an O-ring, for example.

Exhaust space 58 is formed between an inner circumferential face of external cylinder part 501B and outer circumferential faces of distal end portion 51 and intermediate portion 52 of body part 501A. An end of first exhaust channel 506 (opening 506A) is connected to exhaust space 58 to communicate with exhaust space 58. The other end of first exhaust channel 506 is connected to vacuum pump 502.

Openable valve 507 is further provided at an intermediate position in first exhaust channel 506. More specifically, openable valve 507 is formed in an area between opening 506A of first exhaust channel 506 and a connection position between second exhaust channel 505 and first exhaust channel 506.

First exhaust channel 506 is configured such that a cross-sectional area of first exhaust channel 506 becomes larger than a cross-sectional area of second exhaust channel 505. This configuration increases a flow rate of air flowing in first exhaust channel 506 to a flow rate larger than a flow rate of air flowing in second exhaust channel 505.

Heights of distal end portion 51 and intermediate portion 52 of body part 501A, a height of external cylinder part 501B, and a connection position between external cylinder part 501B and first exhaust channel 506 are appropriately determined such that exhaust space 58 and first exhaust channel 506 can communicate with each other in a state that body part 501A is located lowest with respect to external cylinder part 501B.

More specifically, in the state that body part 501A is located lowest with respect to external cylinder part 501B, body unit 501 and first exhaust channel 506 are configured such that opening 506A of first exhaust channel 506 opened to the inner circumferential face of external cylinder part 501B is located below rear end portion 53 of body part 501A to allow communication between exhaust space 58 and first exhaust channel 506.

Furthermore, while the other end of second exhaust channel 505 is connected to first exhaust channel 506 according to the mode of the present exemplary embodiment presented by way of example, the manner of connection is not limited to this example. For example, in a different adoptable mode, the other end of second exhaust channel 505 may be connected to a vacuum pump different from vacuum pump 502.

Any modes of driver 503 may be adopted as long as each of body part 501A and external cylinder part 501B can be independently driven by driver 503. For example, driver 503 may have a mechanism utilizing gas pressure, oil pressure, a servomotor or the like.

Any modes of heater 504 may be adopted as long as distal end portion 51 of body part 501A can be heated by heater 504. For example, heater 504 may be constituted by an electric heater.

Any modes of controller 510 may be adopted as long as respective devices constituting vacuum-sealing device 500 can be controlled by controller 510. Controller 510 includes an arithmetic processing unit such as a microprocessor and a central processing unit (CPU), a storage unit constituted by a memory or the like and storing programs under which respective control operations are executed, and a clock unit. Controller 510 performs various controls for vacuum-sealing device 500 under predetermined control programs stored in the storage unit read and executed by the arithmetic processing unit.

Controller 510 may be constituted not only by a single controller but also by a group of controllers. In case of controller 510 constituted by a group of controllers, a plurality of controllers control vacuum-sealing device 500 in cooperation with each other. In addition, controller 510 may be constituted by a microcontroller, or by a microprocessor unit (MPU), a programmable logic controller (PLC), a logic circuit or the like.

Described now with reference to FIGS. 2 to 11 are examples of a vacuum heat insulator vacuum-sealed by vacuum-sealing device 500 according to the present exemplary embodiment, and a heat insulation device including this vacuum heat insulator.

[Configuration of Heat Insulation Device]

Figure 2:
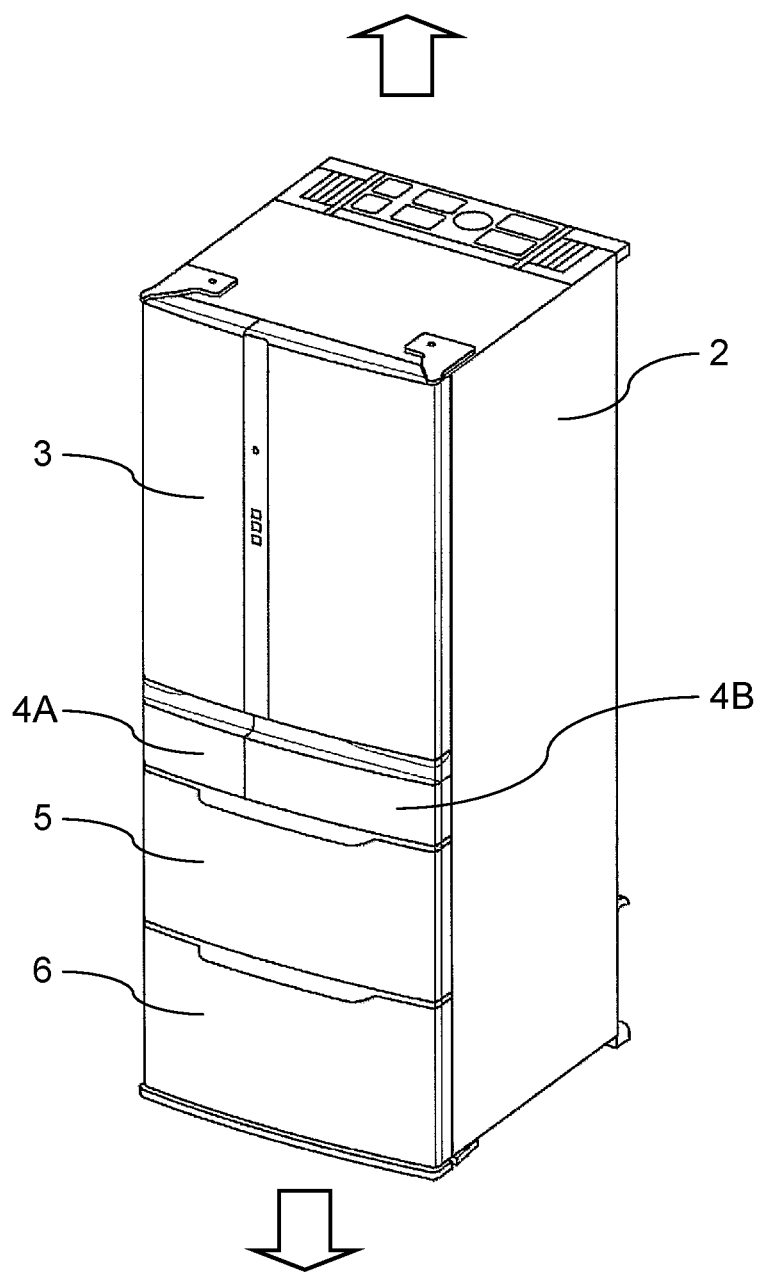
FIG. 2 is a perspective view illustrating a general configuration of a heat insulation device which includes a vacuum heat insulator vacuum-sealed by the vacuum-sealing device according to the first exemplary embodiment of the present disclosure.
Figure 3:
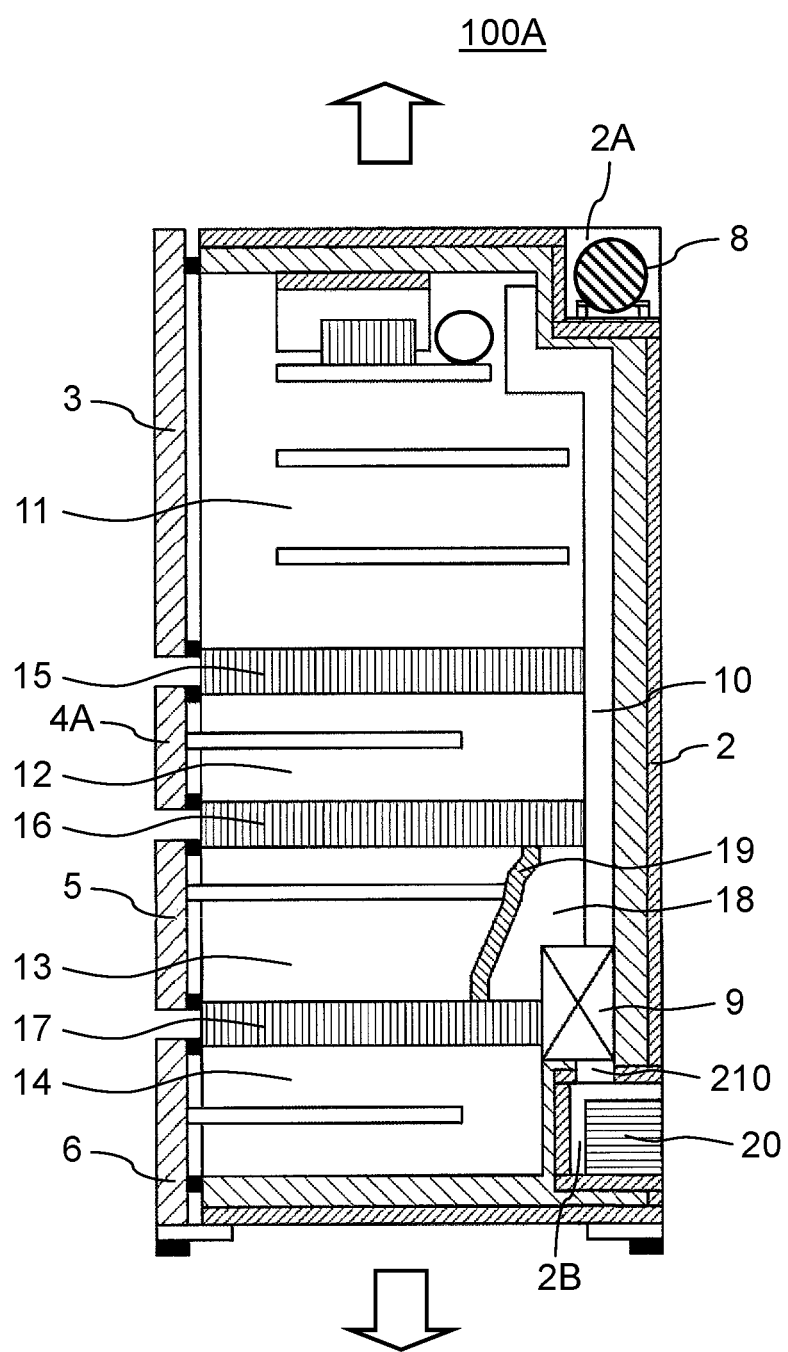
FIG. 3 is a longitudinal sectional view of the heat insulation device including the vacuum heat insulator vacuum-sealed by the vacuum-sealing device according to the first exemplary embodiment of the present disclosure.

FIG. 2 is a perspective view illustrating a general configuration of a heat insulation device which includes a vacuum heat insulator vacuum-sealed by the vacuum-sealing device according to the first exemplary embodiment of the present disclosure. FIG. 3 is a longitudinal sectional view of the heat insulation device which includes the vacuum heat insulator vacuum-sealed by the vacuum-sealing device according to the first exemplary embodiment of the present disclosure. Concerning an up-down direction of heat insulation device 100A, an upward direction and a downward direction of heat insulation device 100A correspond to an upward direction and a downward direction as viewed in each of FIGS. 2 and 3 as indicated by arrows in the respective figures.

As illustrated in FIGS. 2 and 3, a refrigerator is presented as an example of heat insulation device 100A which includes a vacuum heat insulator vacuum-sealed by vacuum-sealing device 500 according to the first exemplary embodiment of the present disclosure. Heat insulation device 100A includes refrigerator body 2 which includes a plurality of storage compartments, refrigerating compartment door 3, ice-making compartment door 4A, first freezing compartment door 4B, vegetable compartment door 5, second freezing compartment door 6, compressor 8, and evaporator 9.

Recess 2A recessed downward from a top face of refrigerator body 2 is formed in a rear side upper part of refrigerator body 2. Recess 2A constitutes a machine compartment where compressor 8 is disposed. Recess 2B recessed toward a front face of refrigerator body 2 from a rear face of refrigerator body 2 is formed in a lower part of refrigerator body 2.

An interior of refrigerator body 2 is sectioned into the plurality of storage compartments by partition walls 15 to 17. More specifically, refrigerating compartment 11 is provided in an upper part of refrigerator body 2. Ice-making compartment 12 and first freezing compartment (not shown) arranged side by side are provided below refrigerating compartment 11. Vegetable compartment 13 is provided below ice-making compartment 12 and the first freezing compartment. Second freezing compartment 14 is provided below vegetable compartment 13.

The front face of refrigerator body 2 is opened. A plurality of doors are provided on the front face of refrigerator body 2. More specifically, rotary type refrigerating compartment door 3 is disposed at refrigerating compartment 11. Ice-making compartment door 4A, first freezing compartment door 4B, vegetable compartment door 5, and second freezing compartment door 6, each of which is of a drawer type including a rail and the like, are disposed at ice-making compartment 12, the first freezing compartment, vegetable compartment 13, and second freezing compartment 14, respectively.

Compressor 8 is disposed in recess 2A. According to the mode of the present exemplary embodiment presented by way of example, compressor 8 is disposed in the upper part of refrigerator body 2. However, in a different adoptable mode, compressor 8 may be positioned in a central part or a lower part of refrigerator body 2.

Cooling compartment 18 is further provided on a rear side central part of refrigerator body 2. Cooling compartment 18 on a rear side of vegetable compartment 13 is sectioned from vegetable compartment 13 by cooling compartment wall body 19 which connects partition wall 16 and partition wall 17. Evaporator 9 is disposed in cooling compartment 18.

Evaporator 9 is configured to achieve heat exchange between refrigerant supplied from compressor 8 and air present within cooling compartment 18. According to this configuration, air around evaporator 9 is cooled, and supplied in a cooled state via cooling channel 10 toward refrigerating compartment 11 and others by a fan or the like. Cooling channel 10 is constituted by a space formed between a not-shown partition wall and the rear face of refrigerator body 2.

Evaporating dish 20 is disposed in recess 2B to store water generated from evaporator 9. Refrigerator body 2 further includes through hole 210 formed between evaporator 9 and evaporating dish 20.

According to heat insulation device 100A in the present exemplary embodiment, at least one of refrigerator body 2, refrigerating compartment door 3, ice-making compartment door 4A, first freezing compartment door 4B, vegetable compartment 5, second freezing compartment door 6, portion walls 15 to 17, and cooling compartment wall body 19 includes a heat insulation wall which houses vacuum heat insulator 101A according to the present exemplary embodiment.

[Configuration of Ice-Making Compartment Door (Vacuum Heat Insulator)]

Described now with reference to FIGS. 4 to 11 is ice-making compartment door 4A presented by way of example of a vacuum heat insulator sealed by vacuum-sealing device 500 according to the present exemplary embodiment.

Figure 4:
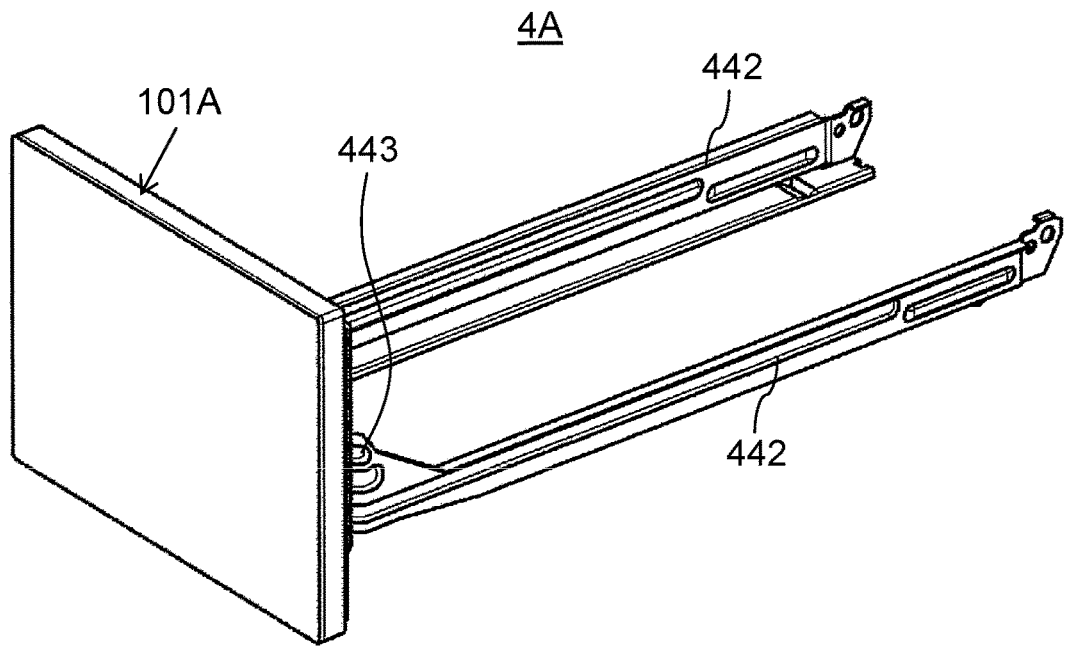
FIG. 4 is a perspective view of an ice-making compartment door of the heat insulation device which includes the vacuum heat insulator vacuum-sealed by the vacuum-sealing device according to the first exemplary embodiment of the present disclosure as viewed from a front face of the ice-making compartment door.
Figure 5:
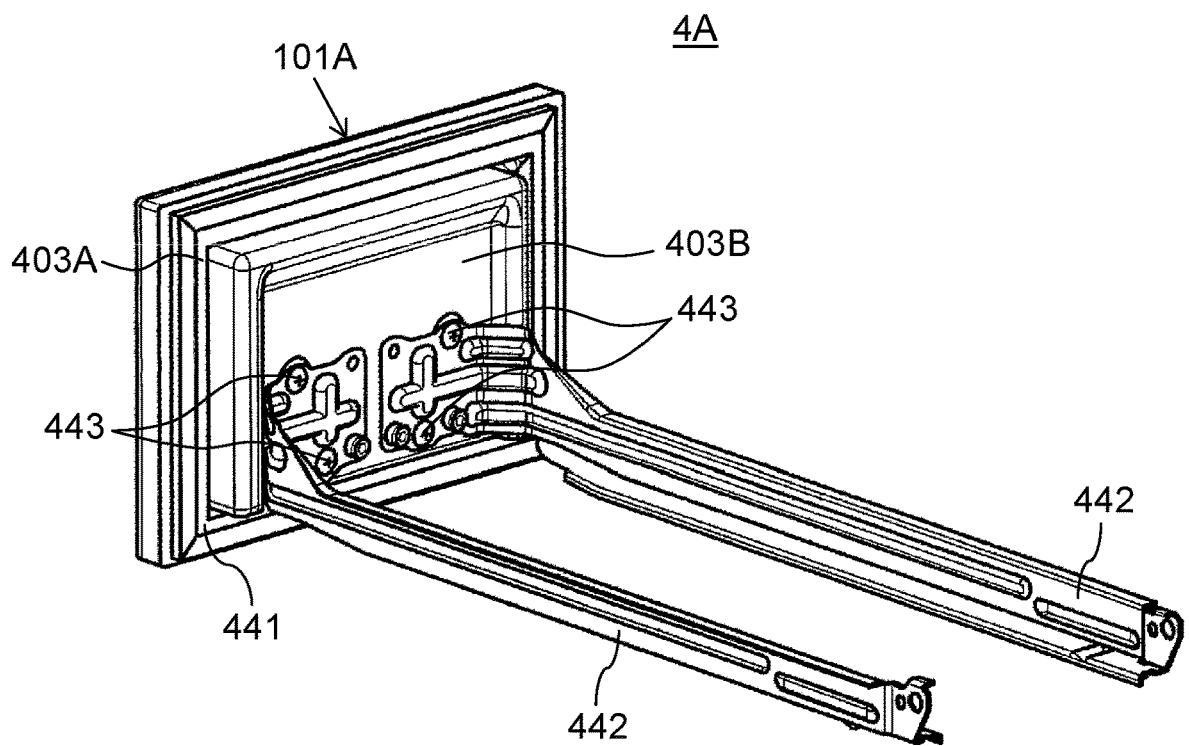
FIG. 5 is a perspective view of the ice-making compartment door of the heat insulation device which includes the vacuum heat insulator vacuum-sealed by the vacuum-sealing device according to the first exemplary embodiment of the present disclosure as viewed from a rear face of the ice-making compartment door.

FIG. 4 is a perspective view of the ice-making compartment door of the heat insulation device which includes the vacuum heat insulator vacuum-sealed by the vacuum-sealing device according to the first exemplary embodiment of the present disclosure as viewed from a front face of the ice-making compartment door. FIG. 5 is a perspective view of the ice-making compartment door of the heat insulation device which includes the vacuum heat insulator vacuum-sealed by the vacuum-sealing device according to the first exemplary embodiment of the present disclosure as viewed from a rear face of the ice-making compartment door.

Figure 6:
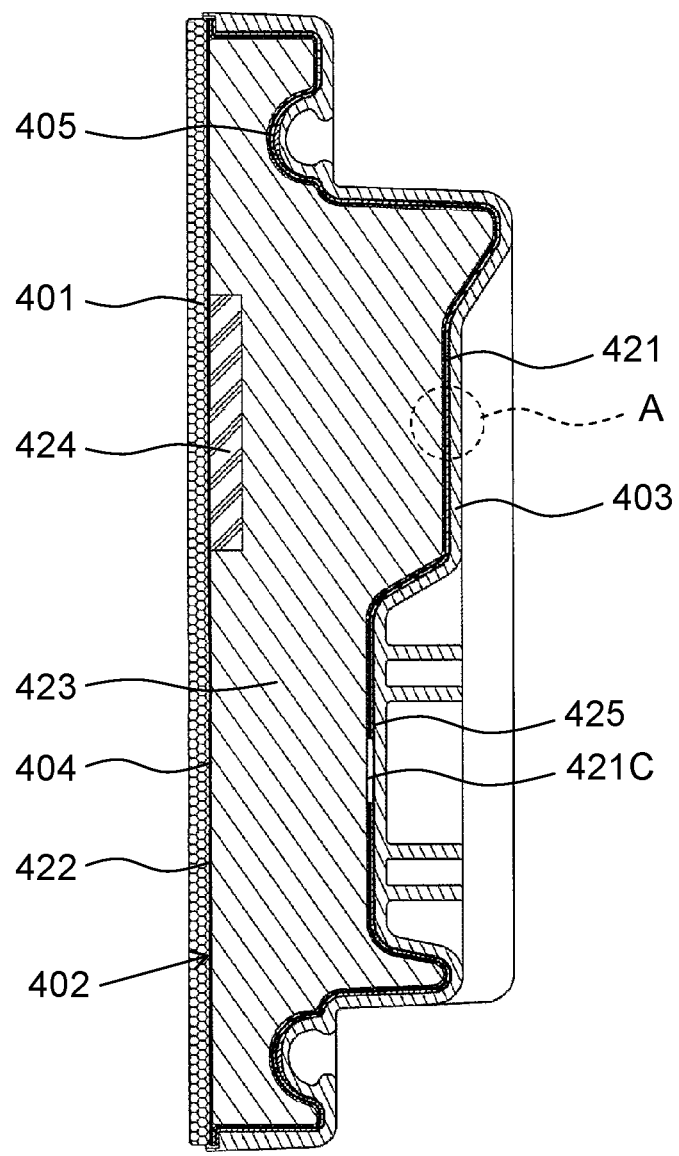
FIG. 6 is a longitudinal sectional view of the vacuum heat insulator vacuum-sealed by the vacuum-sealing device according to the first exemplary embodiment of the present disclosure.
Figure 7:
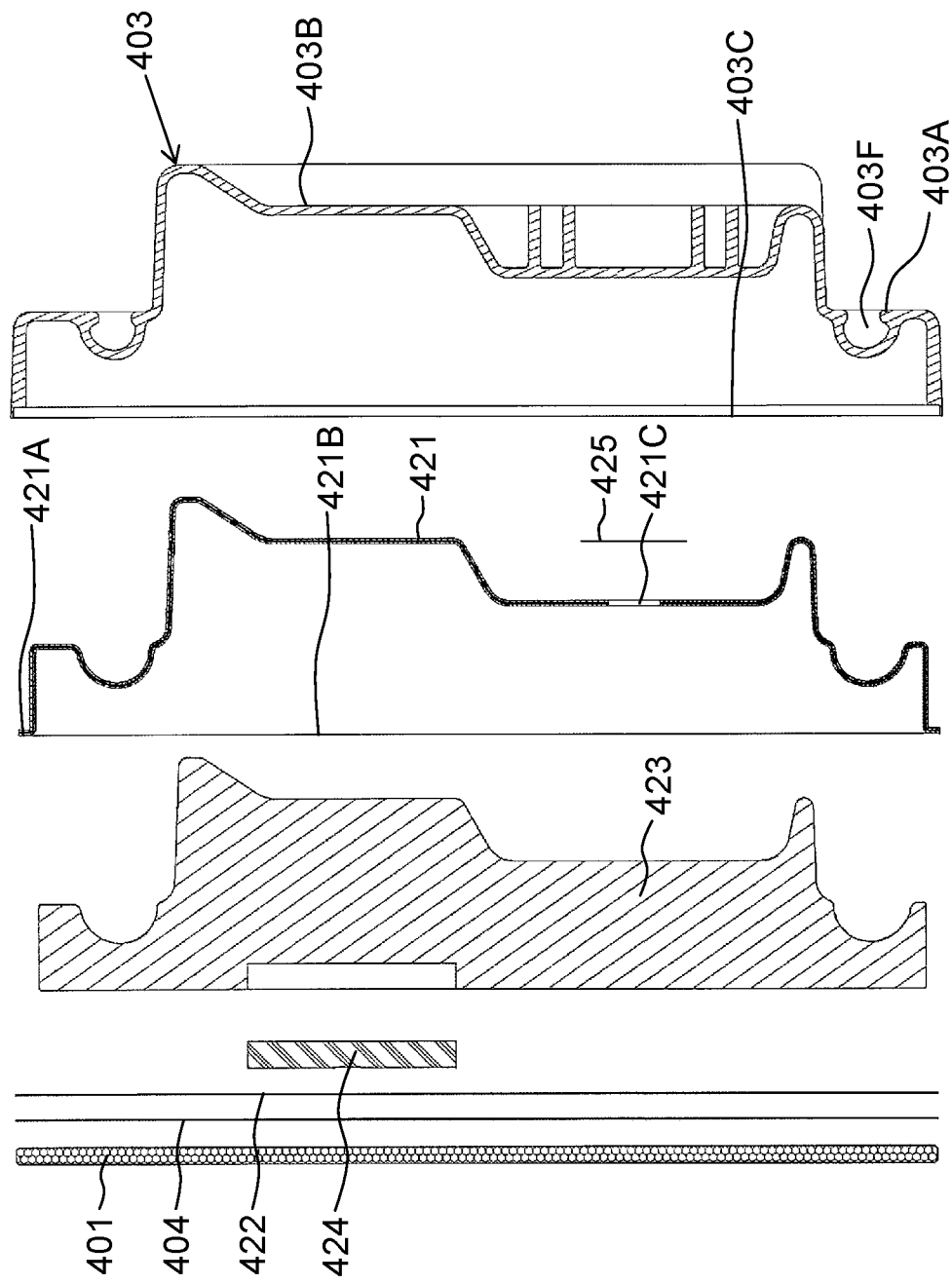
FIG. 7 is a developed view illustrating respective developed members which constitute the vacuum heat insulator vacuum-sealed by the vacuum-sealing device according to the first exemplary embodiment of the present disclosure.
Figure 8:
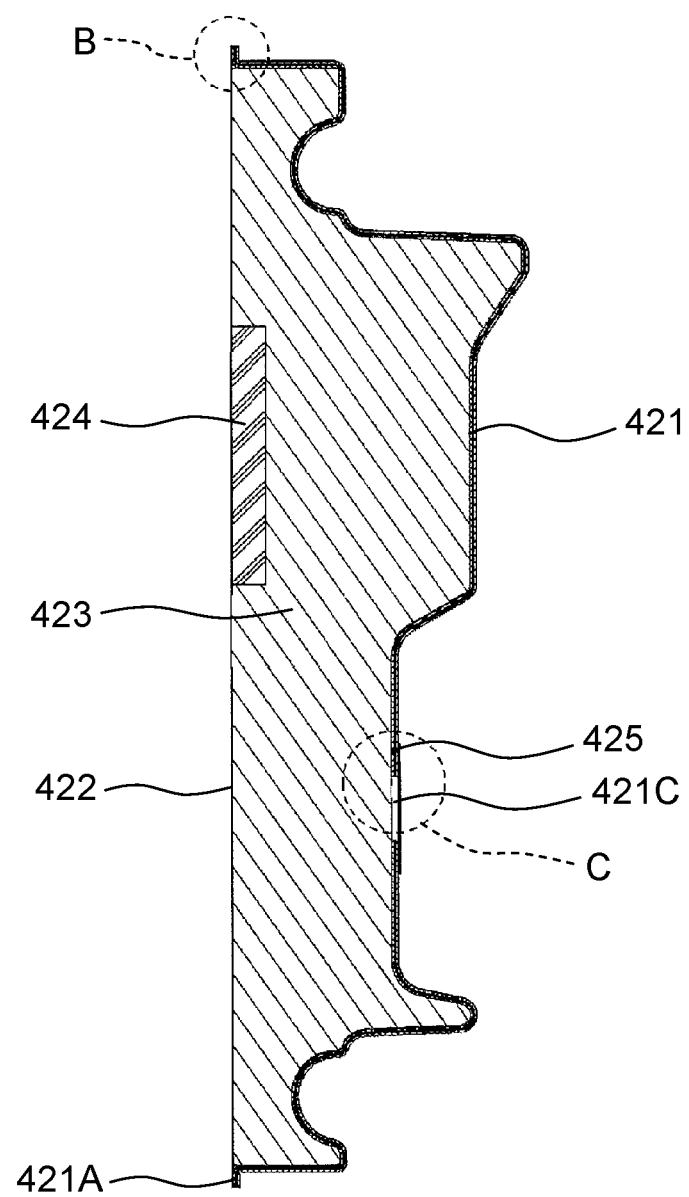
FIG. 8 is a longitudinal sectional view of a gas barrier container of the ice-making compartment door which includes the vacuum heat insulator vacuum-sealed by the vacuum-sealing device according to the first exemplary embodiment of the present disclosure.
Figure 9:
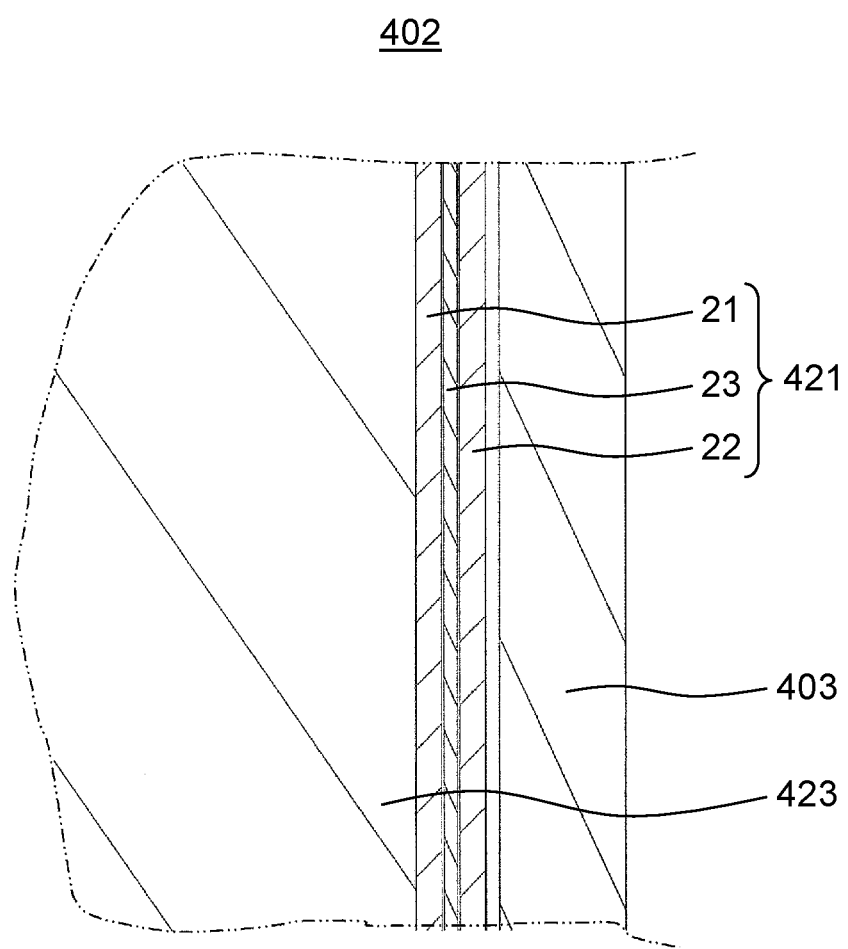
FIG. 9 is a schematic view illustrating an enlarged part A shown in FIG. 6 and included in the vacuum heat insulator vacuum-sealed by the vacuum-sealing device according to the first exemplary embodiment of the present disclosure.
Figure 10:
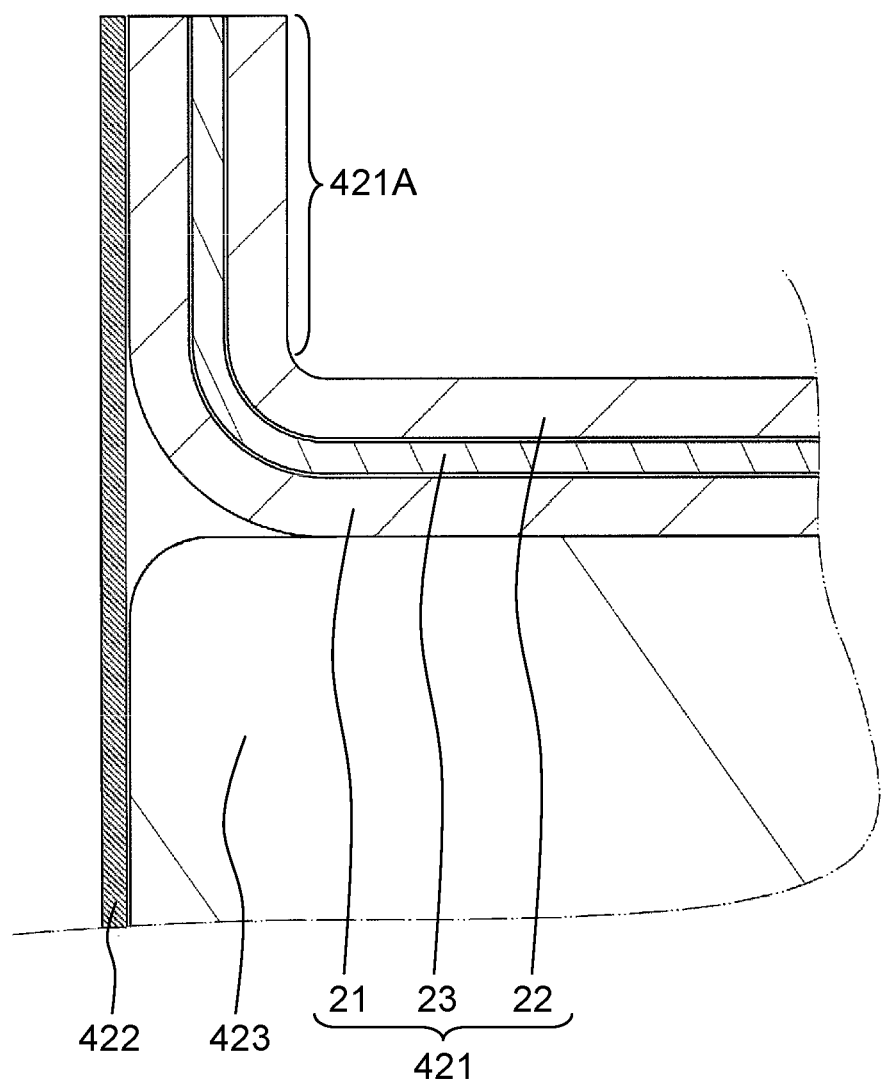
FIG. 10 is a schematic view illustrating an enlarged part B shown in FIG. 8 and included in the gas barrier container of the vacuum heat insulator vacuum-sealed by the vacuum-sealing device according to the first exemplary embodiment of the present disclosure.
Figure 11:
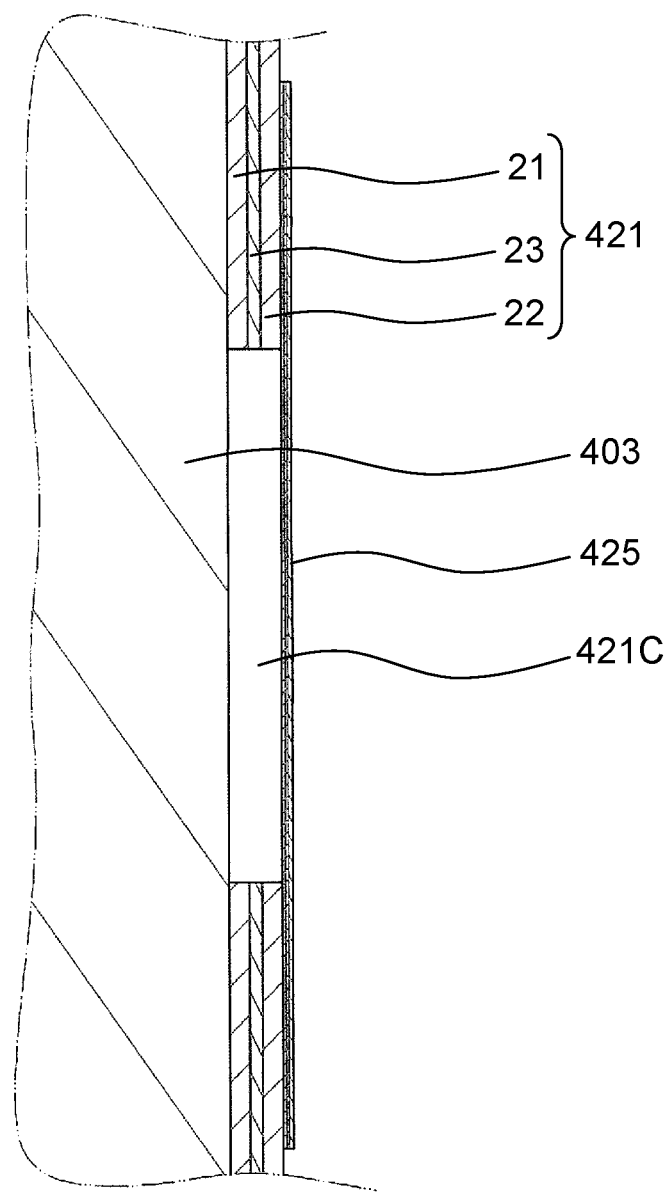
FIG. 11 is a schematic view illustrating an enlarged part C shown in FIG. 8 and included in the gas barrier container of the vacuum heat insulator vacuum-sealed by the vacuum-sealing device according to the first exemplary embodiment of the present disclosure.

FIG. 6 is a longitudinal sectional view of the vacuum heat insulator included in the ice-making compartment door and vacuum-sealed by the vacuum-sealing device according to the first exemplary embodiment of the present disclosure. FIG. 7 is a developed view illustrating respective developed members which constitute the vacuum heat insulator which includes the vacuum heat insulator vacuum-sealed by the vacuum-sealing device according to the first exemplary embodiment of the present disclosure. FIG. 8 is a longitudinal sectional view of a gas barrier container of the ice-making compartment door which includes the vacuum heat insulator vacuum-sealed by the vacuum-sealing device according to the first exemplary embodiment of the present disclosure. FIG. 9 is a schematic view illustrating an enlarged part A shown in FIG. 6 and included in the vacuum heat insulator which includes the vacuum heat insulator vacuum-sealed by the vacuum-sealing device according to the first exemplary embodiment of the present disclosure. FIG. 10 is a schematic view illustrating an enlarged part B shown in FIG. 8 and included in the gas barrier container of the vacuum heat insulator which includes the vacuum heat insulator vacuum-sealed by the vacuum-sealing device according to the first exemplary embodiment of the present disclosure. FIG. 11 is a schematic view illustrating an enlarged part C shown in FIG. 8 and included in the gas barrier container of the vacuum heat insulator which includes the vacuum heat insulator vacuum-sealed by the vacuum-sealing device according to the first exemplary embodiment of the present disclosure.

As illustrated in FIGS. 4 and 5, ice-making compartment door 4A includes vacuum heat insulator 101A, gasket 441, a pair of frames 442, and a plurality of screws 443. As illustrated in FIGS. 6 to 11, vacuum heat insulator 101A includes external plate 401, gas barrier container (hereinafter also abbreviated as a container) 402, and inner box 403 which houses gas barrier container 402.

External plate 401 has a flat plate shape, and is constituted by a glass plate or a precoated steel plate, for example. External plate 401 and gas barrier container 402 are bonded to each other by sheet-shaped (film-shaped) adhesive 404. Adhesive 404 may be constituted by modified silicone or modified polyolefin, for example.

Inner box 403 has a box shape which includes second opening portion 403C. A front face of inner box 403 is opened via second opening portion 403C. Second opening portion 403C of inner box 403 is closed by external plate 401. A rear face of inner box 403 has a stepped shape. The rear face of inner box 403 includes first main face 403A forming a circumferential edge portion of the rear face, and second main face 403B forming a central portion of the rear face (see FIG. 7).

Gasket groove 403F which receives gasket 441 is formed in first main face 403A of inner box 403 in such a shape as to surround second main face 403B. As illustrated in FIGS. 3 and 4, the pair of frames 442 are fastened to a lower part of second main face 403B of inner box 403 by screws 443.

As illustrated in FIGS. 6 to 8, an inner face included in inner box 403 and facing gas barrier container 402 (counter face) has a recessed and protruded shape having a plurality of recesses and protrusions. Adhesive 405 is provided on the counter face of inner box 403. Adhesive 405 may be constituted by modified silicone, for example. Adhesive 405 may be applied to either an entire surface of the counter face of inner box 403, or a part of the counter face.

When adhesive 405 is applied to a part of the counter face of inner box 403, it is preferable that adhesive 405 covers at least a part facing gasket 441. This configuration prevents communication (flow in and out of air) between the outside and a space formed between gas barrier container 402 and inner box 403. Accordingly, further reduction of a heat absorbing load imposed on heat insulation device 100A (refrigerator) is achievable.

As illustrated in FIG. 8, gas barrier container 402 includes first member 421, second member 422, core material 423, absorbent 424, and sealing member 425. Core material 423 and absorbent 424 are disposed in an inner space of a housing formed by first member 421 and second member 422. Gas barrier container 402 is configured to have a predetermined degree of vacuum inside gas barrier container 402.

First member 421 is a molded component produced by vacuum molding, injection molding, pressure molding, press molding, or other methods selected in accordance with the inner surface shape of inner box 403. First member 421 has a box shape including first opening portion 421B.

Flange portion 421A is formed at an outer circumferential edge of first member 421 (see FIGS. 7, 8, and 10). Second member 422 is bonded to flange portion 421A. Accordingly, first opening portion 421B of first member 421 is sealed by second member 422. This configuration achieves a planar press contact of second member 422 via flange portion 421A, allowing rigid seal between first member 421 and second member 422.

First through hole (exhaust hole) 421C is further formed at an appropriate position of a rear face of first member 421. First through hole 421C is a hole through which an interior of gas barrier container 402 (interior of first member 421) is vacuumed. Sealing member 425 for sealing first through hole 421C is provided at a circumferential edge of first through hole 421C.

Sealing member 425 may be constituted by a laminated film, for example. The laminated film may be made of thermoplastic resin such as low density polyethylene film, linear low density polyethylene film, middle density polyethylene film, high density polyethylene film, polypropylene film, and polyacrylonitrile film, or a mixture of these materials.

The laminated film may include a metal layer made of aluminum or stainless steel. In this case, the metal layer may be formed inside the laminated film, or on a surface of the laminated film. The metal layer may be metallic foil such as aluminum foil. Alternatively, aluminum or the like may be deposited on the surface of the laminated film.

Any modes of sealing member 425 may be adopted as long as a gas barrier property is given to sealing member 425. For example, sealing member 425 may be constituted by a glass plate or a precoated steel plate. When sealing member 425 is constituted by a laminated film, sealing member 425 may be welded to the rear face of first member 421 to seal first through hole 421C. When sealing member 425 is constituted by a glass plate or a precoated steel plate, sealing member 425 may be bonded to the rear face of first member 421 by an adhesive to seal first through hole 421C.

As illustrated in FIGS. 9 to 11, first member 421 is constituted by first resin layer 21, second resin layer 22, and gas barrier layer 23 disposed between first resin layer 21 and second resin layer 22.

Each of first resin layer 21 and second resin layer 22 is made of thermoplastic resin. For example, each of first resin layer 21 and second resin layer 22 may be made of polyolefin such as polyethylene and polypropylene. Materials of first resin layer 21 and second resin layer 22 may be either identical or different.

Gas barrier layer 23 contains organic resin and scaly inorganic material. The organic resin constituting gas barrier layer 23 may be ethylene-vinyl alcohol copolymer or polyvinyl alcohol copolymer, for example. The scaly inorganic material may be montmorillonite corresponding to a main component of bentonite as a natural clay mineral, montmorillonite subjected to ion exchange, or synthetic silica, for example. For securing a sufficient gas barrier property of gas barrier layer 23 (for sufficiently reducing oxygen transmission rate), the scaly inorganic material may have a thickness of 1 nm or larger, or an average particle diameter of 100 nm or larger. In addition, for processing a sheet constituting gas barrier layer 23 into a predetermined shape by vacuum molding, the scaly inorganic material may have a thickness of 3 nm or smaller, or an average particle diameter of 300 nm or smaller.

According to the mode of the present exemplary embodiment presented by way of example, first member 421 is constituted by a plurality of layers. However, in a different adoptable mode, first member 421 may be constituted by a single layer made of organic resin such as thermoplastic resin. In addition, first member 421 may include a metal layer made of aluminum, stainless steel, or the like disposed at least one of outer faces of first member 421.

Second member 422 is configured to tightly close first opening 421B of first member 421. Second member 422 may be constituted by a laminated film, for example. The laminated film may be made of thermoplastic resin such as low density polyethylene film, linear low density polyethylene film, middle density polyethylene film, high density polyethylene film, polypropylene film, and polyacrylonitrile film, or a mixture of these materials.

The laminated film may include a metal layer made of aluminum or stainless steel. In this case, the metal layer may be formed inside the laminated film, or on a surface of the laminated film. The metal layer may be metallic foil such as aluminum foil, or aluminum or the like deposited on the surface of the laminated film. Second member 422 may have a configuration either identical to or different from the configuration of sealing member 425.

Core material 423 may be constituted by open-cell urethane foam, for example. The open-cell urethane foam may be a material having characteristics disclosed in PTL 2, for example. In this case, core material 423 has a shape identical to a shape of an inner face (inner space) of first member 421. Core material 423 may be made of glass fibers, rock wool, alumina fibers, or polyethylene terephthalate fibers, for example.

Absorbent 424 is a moisture absorbent which absorbs and removes moisture, or a gas absorbent which absorbs gas such as atmospheric gas, for example. The moisture absorbent may be made of a chemical absorbing substance such as calcium oxide and magnesium oxide, or a physical absorbing substance such as zeolite, for example.

The gas absorbent is constituted by an absorbing material capable of absorbing non-condensable gas contained in gas, and a container. Examples of the absorbing material include an alloy composed of zirconium, vanadium, and tungsten, an alloy composed of iron, manganese, yttrium, lanthanum, and one of rare-earth elements, Ba—Li alloy, and zeolite subjected to ion exchange with metal ion (e.g., copper ion).

[Method for Operating Vacuum-Sealing Device]

Described now with reference to FIGS. 12 to 15 is a method for operating vacuum-sealing device 500 (a method for manufacturing gas barrier container 402) according to the present exemplary embodiment.

Figure 12:
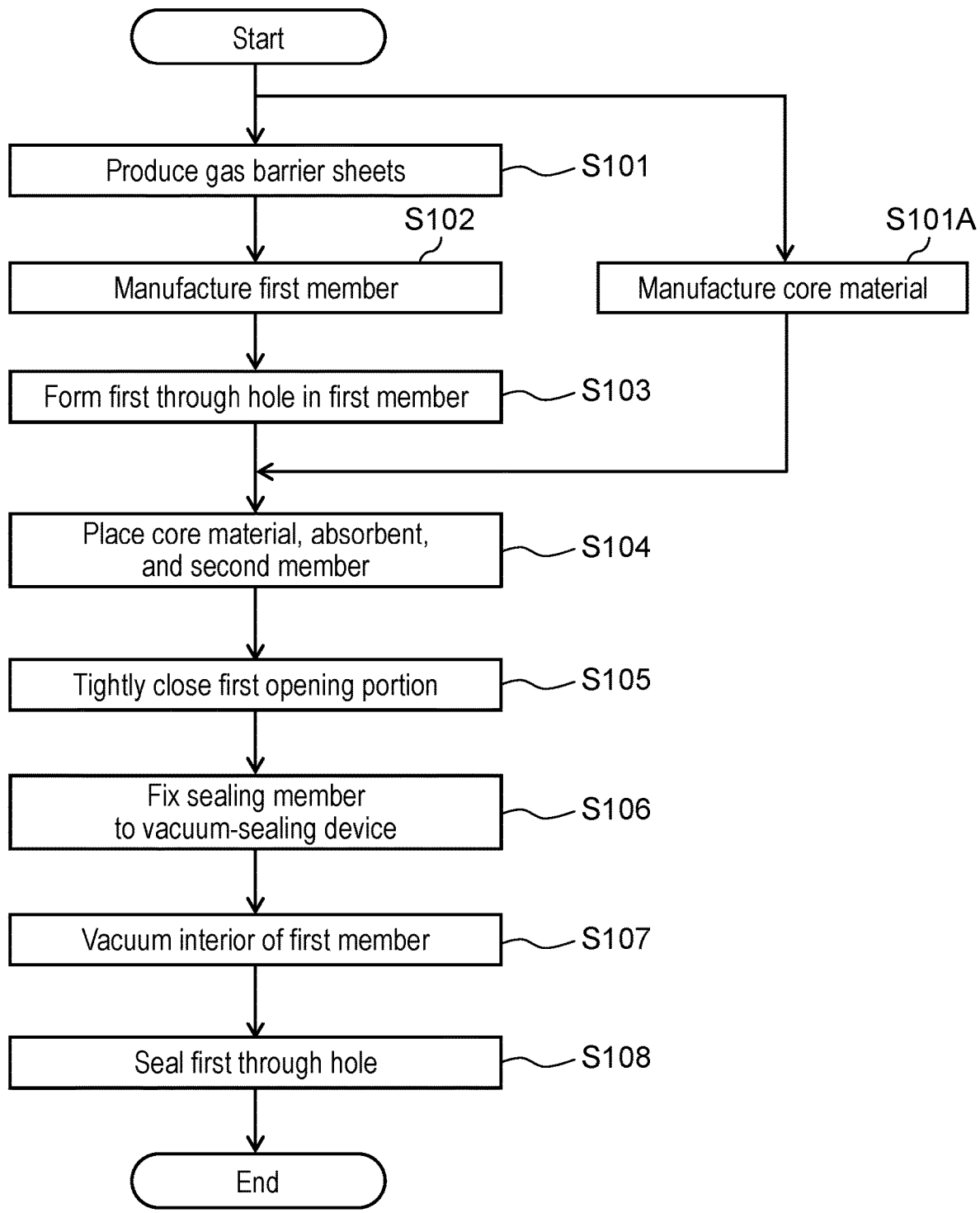
FIG. 12 is a flowchart illustrating respective steps of a method for operating the vacuum-sealing device according to the first exemplary embodiment according to the first exemplary embodiment of the present disclosure.
Figure 13:
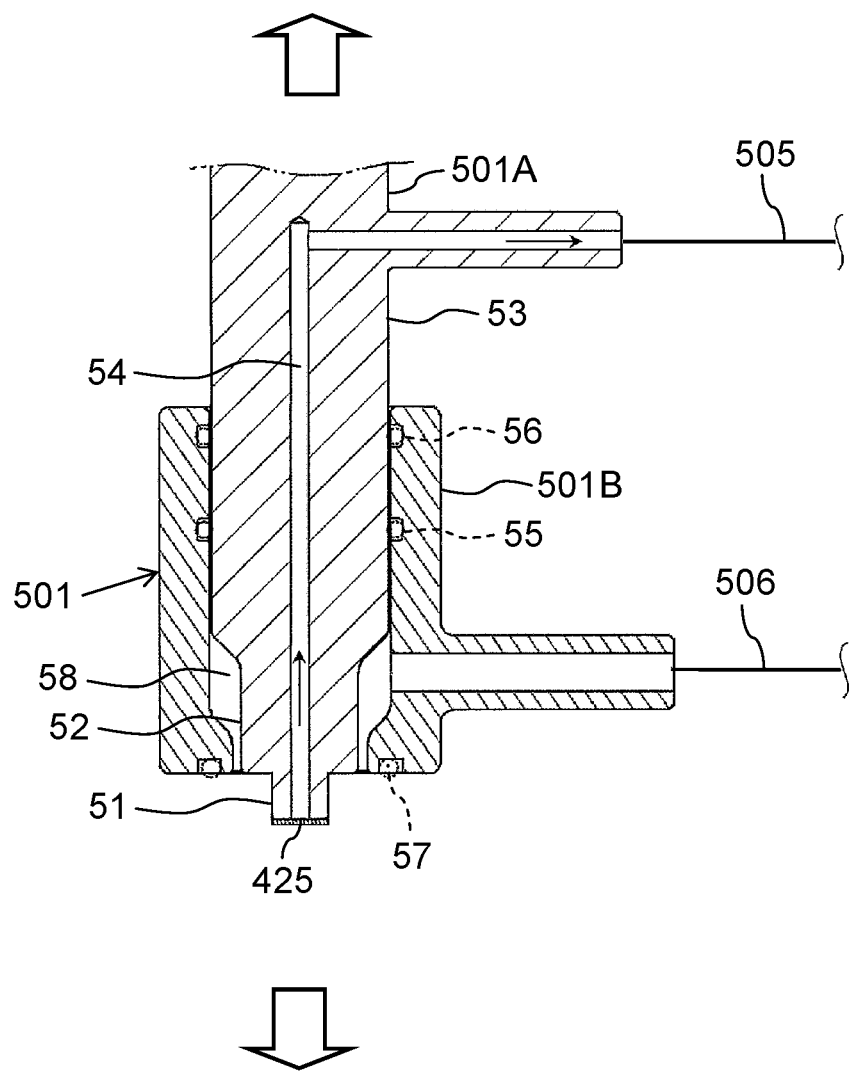
FIG. 13 is a schematic view illustrating a manufacturing step performed in step S106 (step for fixing sealing member to vacuum-sealing device) illustrated in FIG. 12.
Figure 14:
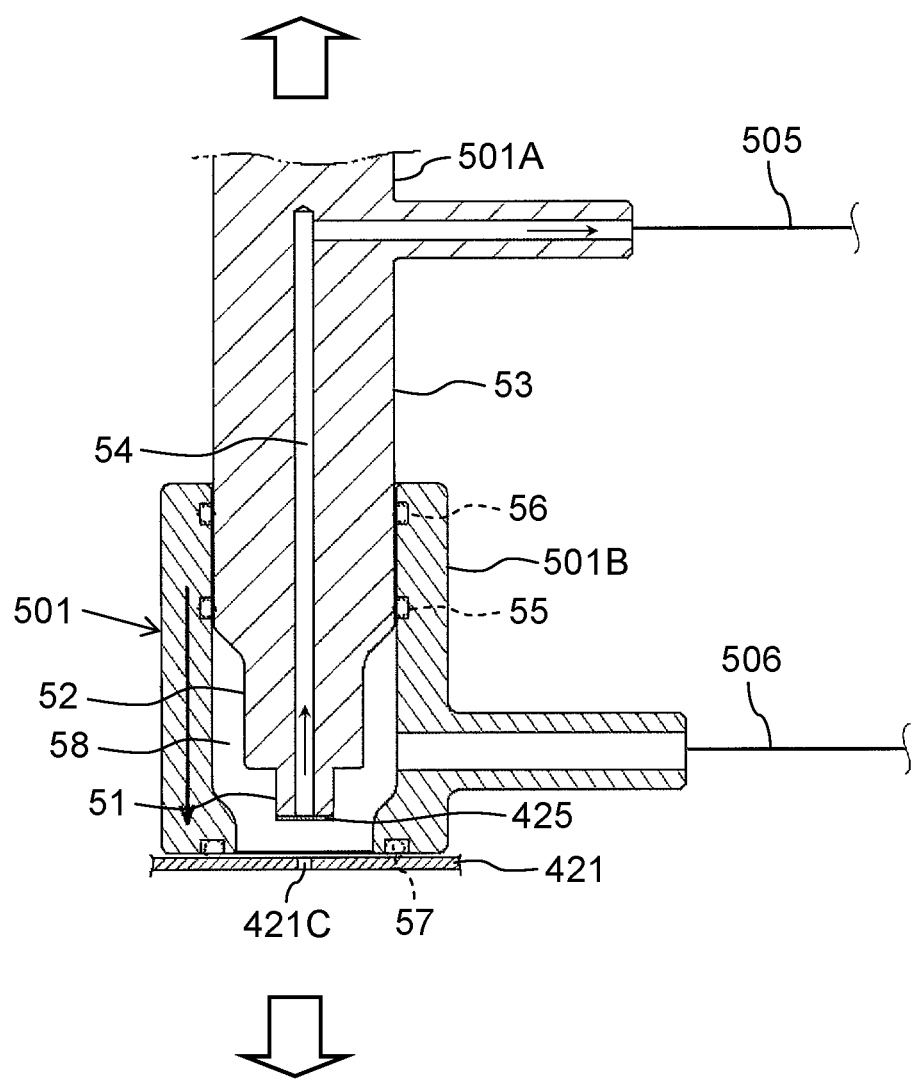
FIG. 14 is a schematic view illustrating a manufacturing step performed in step S107 (step for vacuuming interior of first member) illustrated in FIG. 12.
Figure 15:
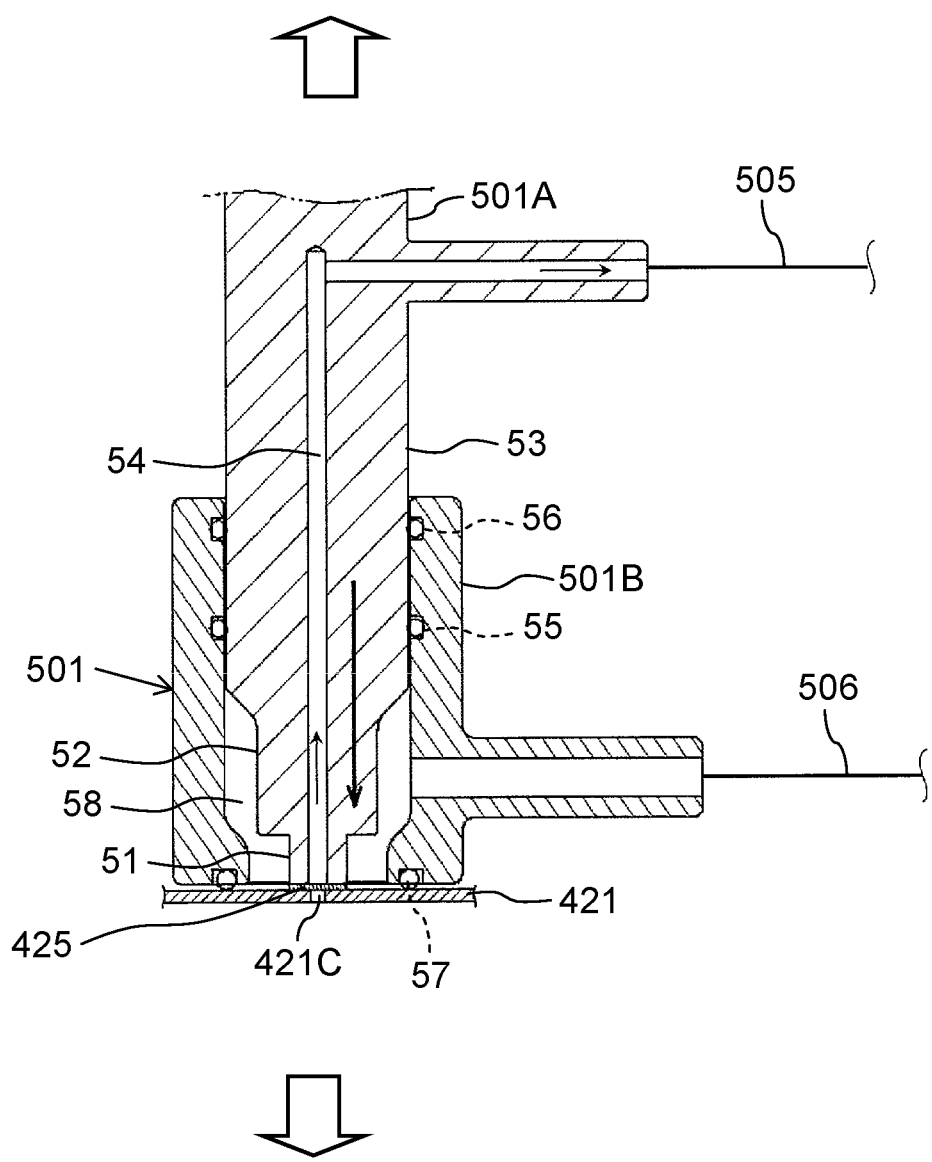
FIG. 15 is a schematic view illustrating a manufacturing step performed in step S108 (step for sealing first through hole) illustrated in FIG. 12.

FIG. 12 is a flowchart illustrating respective steps of the method for operating the vacuum-sealing device (the method for manufacturing the gas barrier container) according to the first exemplary embodiment of the present disclosure. FIG. 13 is a schematic view illustrating a manufacturing step performed in step S106 (a step for fixing a sealing member to a vacuum-sealing device) illustrated in FIG. 12. FIG. 14 is a schematic view illustrating a manufacturing step performed in step S107 (a step for vacuuming an interior of a first member) illustrated in FIG. 12. FIG. 15 is a schematic view illustrating a manufacturing step performed in step S108 (a step for sealing a first through hole) illustrated in FIG. 12.

Concerning an up-down direction of body unit 501 of vacuum-sealing device 500, an upward direction and a downward direction of body unit 501 correspond to an upward direction and a downward direction as viewed in each of FIGS. 13 and 15 as indicated by arrows in the respective figures.

As illustrated in FIG. 12, an operator or the like initially produces gas barrier sheets to manufacture first member 421 constituting gas barrier container 402 (step S101). The gas barrier sheets produced herein include gas barrier layer 23 disposed between first resin layer 21 and second resin layer 22 both made of thermoplastic resin. Gas barrier layer 23 contains organic resin, and 2% to 14% by weight of scaly inorganic resin.

More specifically, the operator or the like produces sheets constituting respective layers of first resin layer 21, second resin layer 22, and gas barrier layer 23, laminates these sheets, and bonds the laminated sheets by thermocompression bonding or other methods to obtain the gas barrier sheets.

Each of first resin layer 21 and second resin layer 22 may be constituted by a known non-oriented polypropylene film when each of first resin layer 21 and second resin layer 22 is made of polypropylene, for example. For manufacturing gas barrier layer 23, sheets or films are produced by adding 2% to 14% by weight of montmorillonite, which is an example of scaly inorganic material, to ethylene-vinyl alcohol copolymer, which is an example of organic resin, by using a known manufacturing method. The montmorillonite may have a thickness ranging from 1 nm to 3 nm, and an average particle diameter ranging from 100 nm to 300 nm.

The operator or the like subsequently processes the gas barrier sheets produced in step S101 into a shape identical to the shape of the inner face (inner space) of inner box 403 by vacuum molding to manufacture first member 421 having a box shape and including first opening portion 421B (step S102). First member 421 may be manufactured by pressure molding or hot press molding, for example.

First through hole 421C (exhaust hole) is subsequently formed at an appropriate position of the rear face of first member 421 (step S103). First through hole 421C may be formed by punching, for example. In manufacturing first member 421 in step S102, in a different adoptable mode, a metal mold of first member 421 including first through hole 421C may be produced in advance to form first through hole 421C using this metal mold during manufacture of first member 421.

In parallel with steps S101 to S103, or before or after steps S101 to S103, the operator or the like manufactures core material 423 (step S101A). More specifically, when core material 423 is constituted by open-cell urethane foam, the open-cell urethane foam is molded into a shape identical to the shape of the inner space of first member 201 in advance to manufacture core material 423, for example. When core material 423 is constituted by glass fibers, rock wool, alumina fibers, or polyethylene terephthalate fibers, for example, these materials are heat and compression-molded to manufacture core material 423.

The operator or the like subsequently places core material 423 and absorbent 424 inside first member 421, and places second member 422 in such a position as to cover an opening of first opening portion 421B (step S104). Thereafter, first opening portion 421B of first member 421 is tightly closed by second member 422 (step S105).

More specifically, for example, first opening portion 421B is tightly closed by heating a contact portion of second member 422 in contact with flange portion 421A of first member 421 and thermocompression-bonding the contact portion of second member 422 to flange portion 421A. Alternatively, first opening portion 421B may be tightly closed by bonding second member 422 and flange portion 421A by an adhesive.

Subsequently, sealing member 425 is fixed to vacuum-sealing device 500 (step S106). More specifically, the arithmetic processing unit of controller 510 reads a predetermined control program stored in the storage unit, and executes the control program to perform the following operations.

Initially, controller 510 drives the not-shown robot device to shift body unit 501 such that distal end face 51E of body part 501A comes to a position above sealing member 425. Controller 510 subsequently closes openable valve 507 to operate vacuum pump 502. Controller 510 then operates driver 503 to shift body part 501A downward and bring distal end face 51E of body part 501A (distal end face 51E of distal end portion 51) and sealing member 425 into contact with each other (see FIG. 13).

In this case, exhaust channel 54 has a negative inside pressure under operation of vacuum pump 502, wherefore such a state that sealing member 425 is attracted to distal end face 51E of body part 501A is maintained. Accordingly, sealing member 425 is fixed (attracted) to vacuum-sealing device 500.

The interior of first member 421 is subsequently vacuumed by vacuum-sealing device 500 (step S107). More specifically, controller 510 drives the not-shown robot device to shift body unit 501 such that distal end face 51E of body part 501A comes to a position above first through hole 421C of first member 421 as illustrated in FIG. 14. Controller 510 then operates driver 503 to shift external cylinder part 501B downward and bring distal end face 501E of external cylinder part 501B into airtight contact with first member 421 constituting gas barrier container 402. At this time, distal end face 51E of body part 501A (distal end portion 51) is located above distal end face 501E of external cylinder part 501B. Accordingly, the opening portion of distal end face 501E of external cylinder part 501B communicates with first through hole 421C of first member 421. Thereafter, controller 510 opens openable valve 507 (see FIG. 14).

As a result, first exhaust channel 506 and vacuum pump 502 communicate with each other, allowing additional exhaust of air from first exhaust channel 506. Accordingly, vacuuming of the interior of first member 421 is achieved via first through hole 421C, the inner space of external cylinder part 501B (exhaust space 58), and first exhaust channel 506.

First through hole 421C is subsequently sealed by sealing member 425 (step S108). More specifically, when the degree of vacuum of the interior of first member 421 reaches a predetermined degree, controller 510 drives driver 503 to shift body part 501A downward and bring sealing member 425 and first member 421 into contact with each other. Controller 510 then operates heater 504 to heat at least a part of body part 501A, or distal end portion 51 according to the present exemplary embodiment, and thereby heat sealing member 425 via distal end portion 51. As a result, sealing member 425 is welded to first member 421, wherefore first through hole 421C is sealed by sealing member 425 (see FIG. 15).

The state that the interior of first member 421 has the predetermined degree of vacuum can be determined based on determination of whether or not a predetermined time has elapsed from the time of vacuuming of the interior of first member 421 in step S107, for example. The predetermined time herein can be calculated from a volume of the interior of first member 421, performance (exhaust quantity) of vacuum pump 502, a channel length of first exhaust channel 506, or other conditions. Alternatively, the predetermined time can be determined beforehand based on experiments or the like.

[Operations and Effects of Vacuum-Sealing Device]

According to vacuum-sealing device 500 and the method for operating vacuum-sealing device 500 configured as above in the present exemplary embodiment, sealing member 425 can be fixed (attracted) to distal end portion 51 of body unit 501 by a negative pressure inside exhaust channel 54. In this case, a necessity of providing a means for fixing sealing member 425 to distal end portion 51 of body unit 501, such as an adhesive, is eliminated. Accordingly, reduction of manufacturing costs of vacuum-sealing device 500 is achievable.

When sealing member 425 is fixed to distal end portion 51 of body unit 501 via an adhesive, the adhesive remains on an outer face of sealing member 425 after seal of first through hole 421C by sealing member 425. In this case, a clearance is produced between an outer face of gas barrier container 402 and an inner face of inner box 403 by the remaining adhesive, in which condition gas barrier and heat insulation properties of heat insulation device 100B may deteriorate.

However, vacuum-sealing device 500 according to the present exemplary embodiment is configured to achieve fixation between sealing member 425 and distal end portion 51 of body unit 501 without using an adhesive. According to vacuum-sealing device 500 and the method for operating vacuum-sealing device 500 in the present exemplary embodiment, therefore, no adhesive remains on the outer face of sealing member 425 after seal of first through hole 421C by sealing member 425.

In this case, no clearance is produced between the outer face of gas barrier container 402 and the inner face of inner box 403. Accordingly, sufficient gas barrier and heat insulation properties of heat insulation device 100B are securable.

Moreover, according to vacuum-sealing device 500 in the present exemplary embodiment, first exhaust channel 506 is configured such that the cross-sectional area of first exhaust channel 506 becomes larger than the cross-sectional area of second exhaust channel 505. According to vacuum-sealing device 500 and the method for operating vacuum-sealing device 500 in the present exemplary embodiment, therefore, a flow rate of air circulating in first exhaust channel 506 can be raised to a value larger than a flow rate of air circulating in second exhaust channel 505. Accordingly, exhaust of air from the interior of gas barrier container 402 (first member 421) is achievable more rapidly, efficiently, and securely.

Second Exemplary Embodiment

An example of a vacuum-sealing device according to a second exemplary embodiment of the present disclosure is hereinafter described with reference to FIGS. 16 through 23.
[Configuration of Vacuum-Sealing Device]

Figure 16:
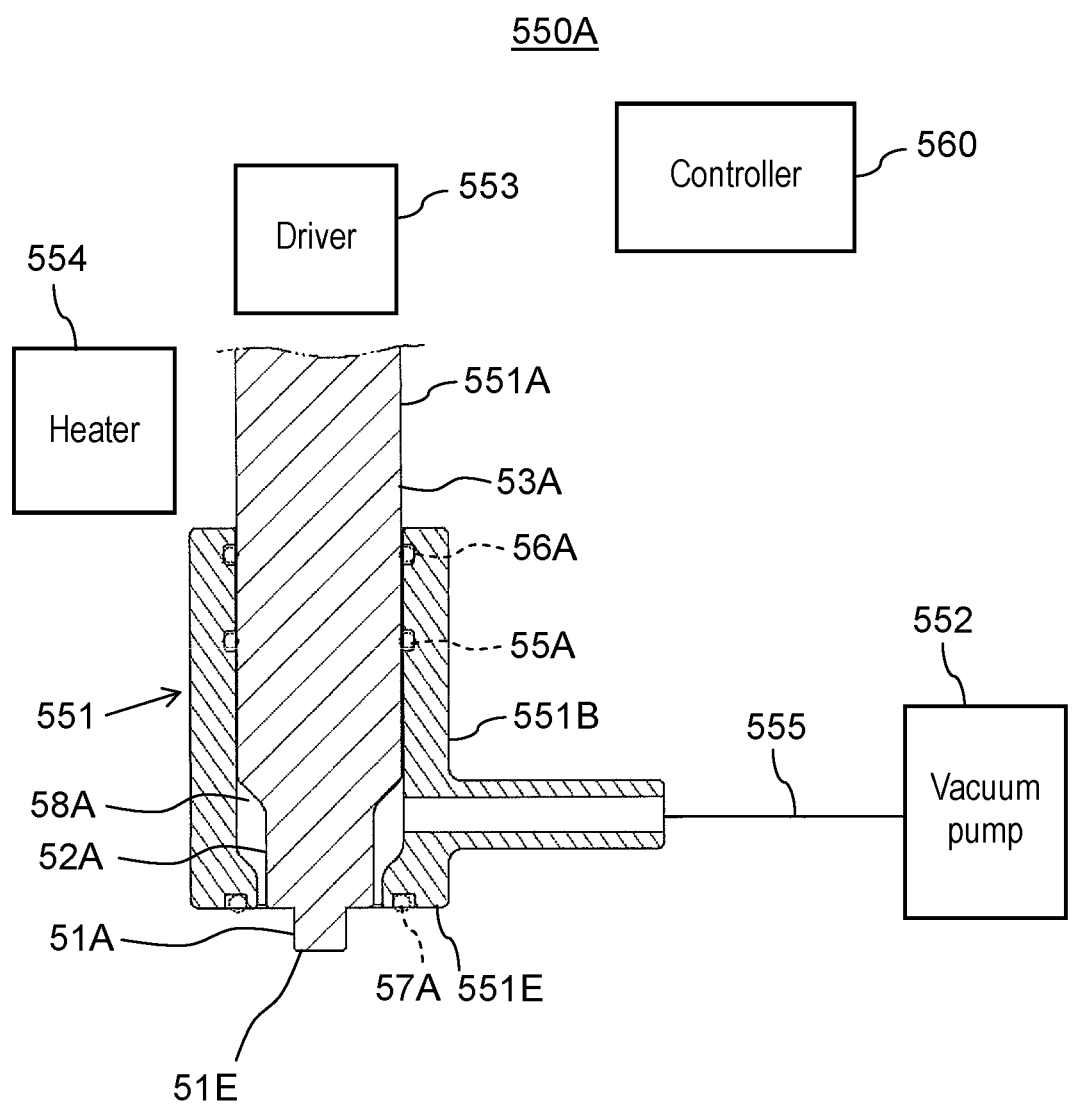
FIG. 16 is a schematic view illustrating a general configuration of a vacuum-sealing device according to a second exemplary embodiment of the present disclosure.

FIG. 16 is a schematic view illustrating a general configuration of the vacuum-sealing device according to the second exemplary embodiment of the present disclosure.

As illustrated in FIG. 16, vacuum-sealing device 550A according to the secondary exemplary embodiment of the present disclosure includes body unit 551, vacuum pump 552, driver 553, heater 554, and controller 560. Body unit 551 includes body part 551A which has a substantially cylindrical shape and includes a step portion, and external cylinder part 551B which has a substantially cylindrical shape and includes a hollow portion. The body unit 551 is also configured such that each of body part 551A and external cylinder part 551B is independently movable forward and backward by driver 553 in a direction of an axial center of external cylinder 551B (up-down direction in the present exemplary embodiment). Vacuum-sealing device 550A may be attached to an arm of a robot device (not shown).

Body part 551A includes distal end portion 51A, intermediate portion 52A, and rear end portion 53A. Body part 551A is configured such that a cross-sectional area of body part 551A decreases in a direction from rear end portion 53A toward distal end portion 51A. More specifically, body part 551A is configured to satisfy a relationship of end area of distal end portion 51A<cross-sectional area of intermediate portion 52A<cross-sectional area of rear end portion 53A.

External cylinder part 551B is disposed in such a position as to surround an outer circumferential face of body part 551A. External cylinder part 551B is configured such that an inner circumferential face of external cylinder part 551B slides on an outer circumferential face of rear end portion 53A of body part 551A. More specifically, sealing members 55A, 56A each having an annular shape are disposed on an inner circumferential face included in external cylinder part 551B and facing rear end portion 53A. Each of sealing members 55A, 56A may be constituted by an O-ring, for example.

A recess having an annular shape is further formed in distal end face 551E of external cylinder part 551B. Sealing member 57A is disposed in this recess. Sealing member 57A may be constituted by an O-ring, for example.

Exhaust space 58A is formed between an inner circumferential face of external cylinder part 551B and outer circumferential faces of distal end portion 51A and intermediate portion 52A of body part 551A. An end of exhaust channel 555 is connected to exhaust space 58A to communicate with exhaust space 58A. The other end of exhaust channel 555 is connected to vacuum pump 552.

Any modes of driver 553 may be adopted as long as each of body part 551A and external cylinder part 551B can be independently driven by driver 553. For example, driver 553 may have a mechanism utilizing gas pressure, oil pressure, a servomotor or the like.

Any modes of heater 554 may be adopted as long as at least a part of body part 551A (distal end portion 51A according to the present exemplary embodiment) can be heated by heater 554. For example, heater 554 may be constituted by an electric heater.

Any modes of controller 560 may be adopted as long as respective devices constituting vacuum-sealing device 550A can be controlled by controller 560. Controller 560 includes an arithmetic processing unit such as a microprocessor and a CPU, a storage unit constituted by a memory or the like and storing programs under which respective control operations are executed, and a clock unit. Controller 560 performs various controls for vacuum-sealing device 550A under predetermined control programs stored in the storage unit read and executed by the arithmetic processing unit.

Controller 560 may be constituted not only by a single controller but also by a group of controllers. In case of controller 560 constituted by a group of controllers, a plurality of controllers control vacuum-sealing device 550A in cooperation with each other. In addition, controller 560 may be constituted by a microcontroller, or by an MPU, a programmable logic controller (PLC), a logic circuit, or the like.

Figure 17:
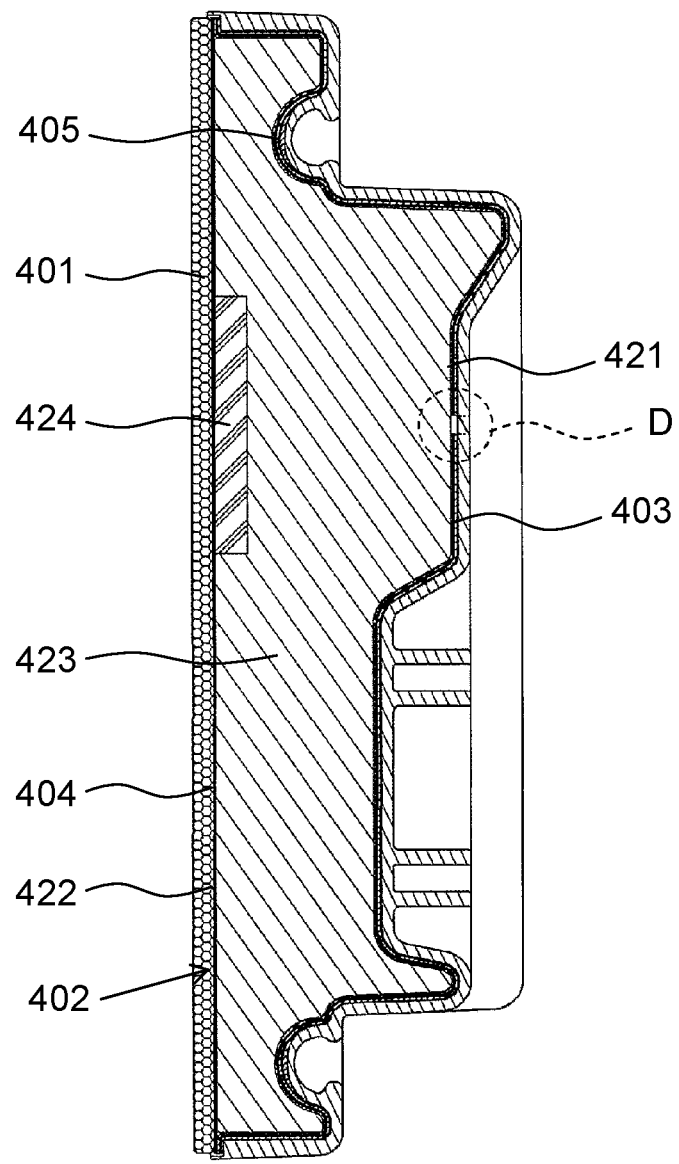
FIG. 17 is a longitudinal sectional view illustrating a general configuration of a vacuum heat insulator vacuum-sealed by the vacuum-sealing device according to the second exemplary embodiment of the present disclosure.
Figure 18:
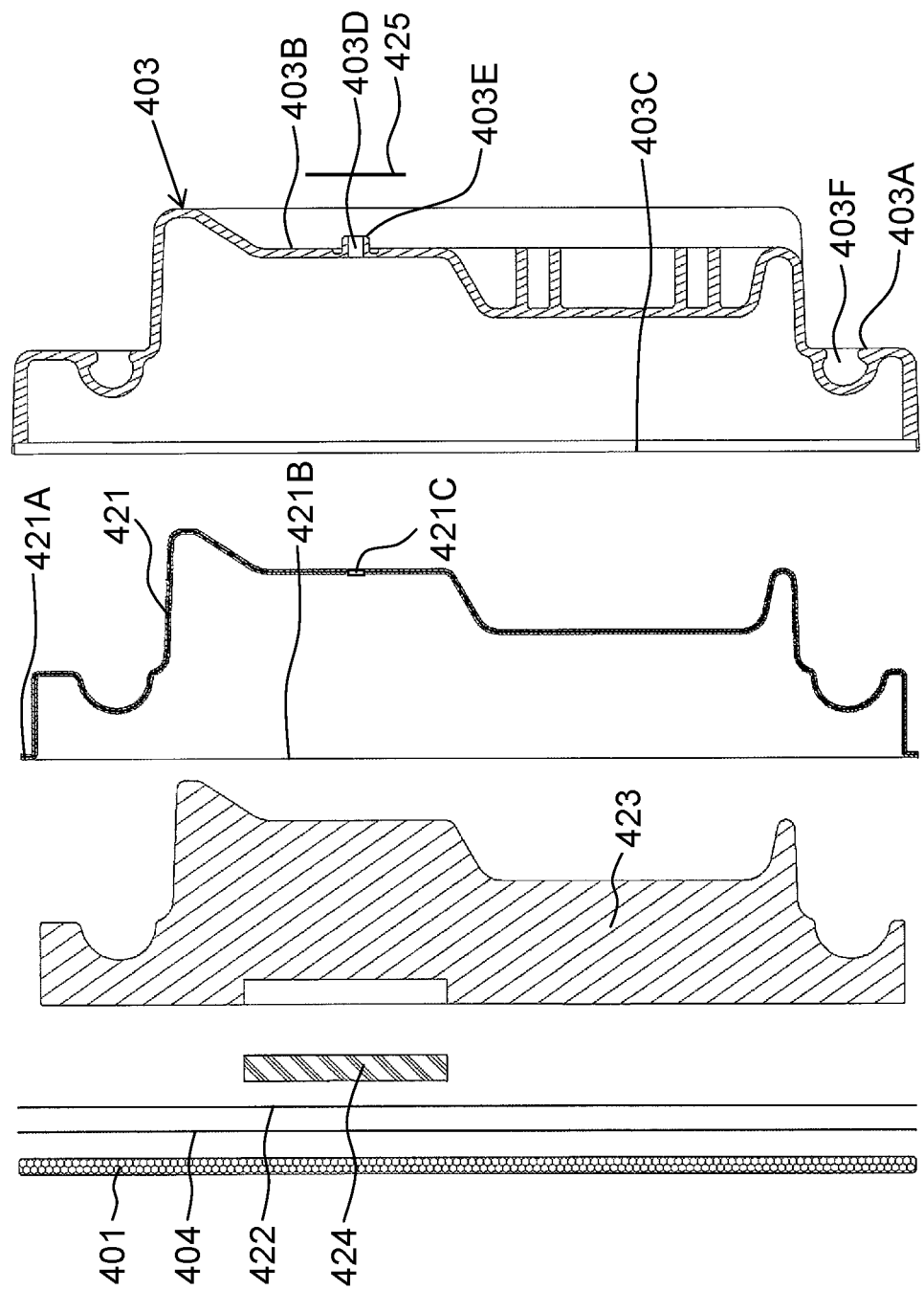
FIG. 18 is a developed view illustrating respective developed members which constitute the vacuum heat insulator vacuum-sealed by the vacuum-sealing device according to the second exemplary embodiment of the present disclosure.
Figure 19:
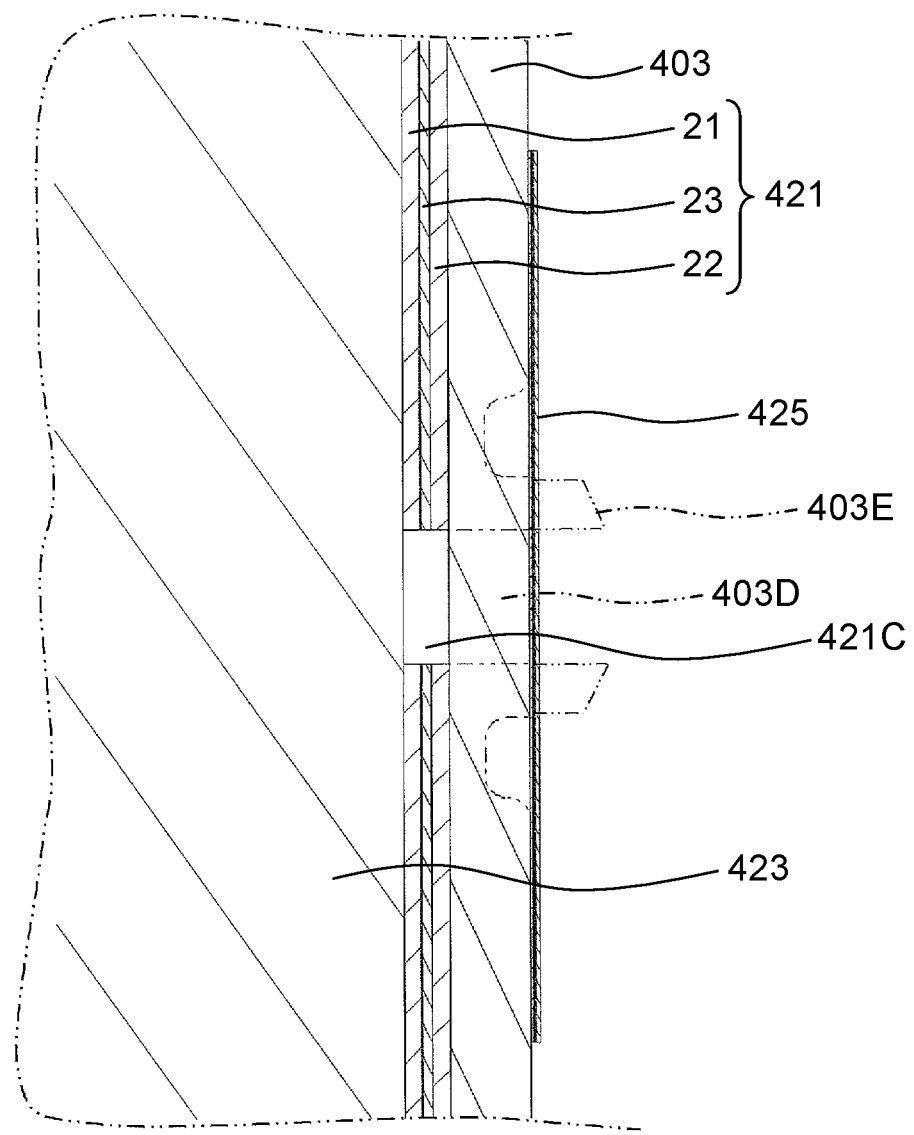
FIG. 19 is a schematic view illustrating an enlarged part D shown in FIG. 17 and included in the vacuum heat insulator vacuum-sealed by the vacuum-sealing device according to the second exemplary embodiment of the present disclosure.

Described now with reference to FIGS. 17 to 19 is an example of a vacuum heat insulator vacuum-sealed by vacuum-sealing device 550A according to the second exemplary embodiment of the present disclosure.
[Configuration of Vacuum Heat Insulator]

FIG. 17 is a longitudinal sectional view illustrating a general configuration of the vacuum heat insulator vacuum-sealed by the vacuum-sealing device according to the second exemplary embodiment of the present disclosure. FIG. 18 is a developed view illustrating respective developed members which constitute the vacuum heat insulator vacuum-sealed by the vacuum-sealing device according to the second exemplary embodiment of the present disclosure. FIG. 19 is a schematic view illustrating an enlarged part D of the vacuum heat insulator vacuum-sealed by the vacuum-sealing device according to the second exemplary embodiment of the present disclosure.

As illustrated in FIGS. 17 to 19, a basic configuration of vacuum heat insulator 101B vacuum-sealed by vacuum-sealing device 550A according to the present exemplary embodiment is similar to the basic configuration of vacuum heat insulator 101A vacuum-sealed by vacuum-sealing device 500 according to the first exemplary embodiment. However, the following points are different.

According to vacuum heat insulator 101B vacuum-sealed by vacuum-sealing device 550A in the second exemplary embodiment of the present disclosure, second through hole (exhaust hole) 403D is formed at a portion included in second main face 403B of inner box 403 and facing first through hole 421C of first member 421. Boss 403E is provided at a circumferential edge of second through hole 403D. Boss 403E is heated during manufacture of vacuum heat insulator 101B to close second through hole 403D. Appropriate dimensions such as a height and a thickness of boss 403E are determined so as to close second through hole 403D.

In addition, according to vacuum heat insulator 101B vacuum-sealed by vacuum-sealing device 550A in the present exemplary embodiment, sealing member 425 is welded to second main face 403B to seal second through hole 403D.
[Method for Operating Vacuum-Sealing Device]

Described now with reference to FIGS. 16 to 23 is a method for operating vacuum-sealing device 550A (a method for manufacturing gas barrier container 402) according to the present exemplary embodiment.

Figure 20:
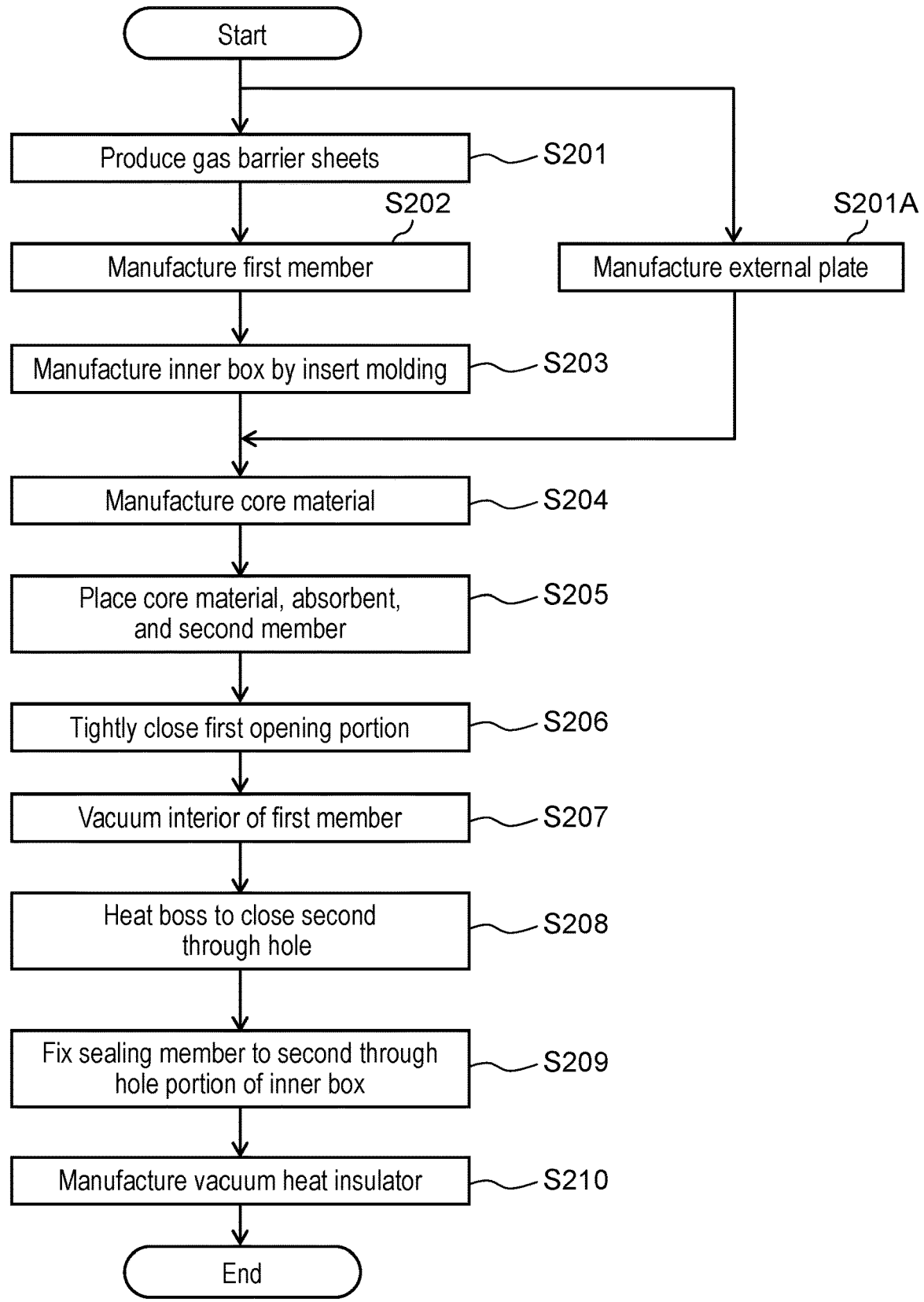
FIG. 20 is a flowchart illustrating respective steps of a method for operating the vacuum-sealing device according to the second exemplary embodiment of the present disclosure.
Figure 21:
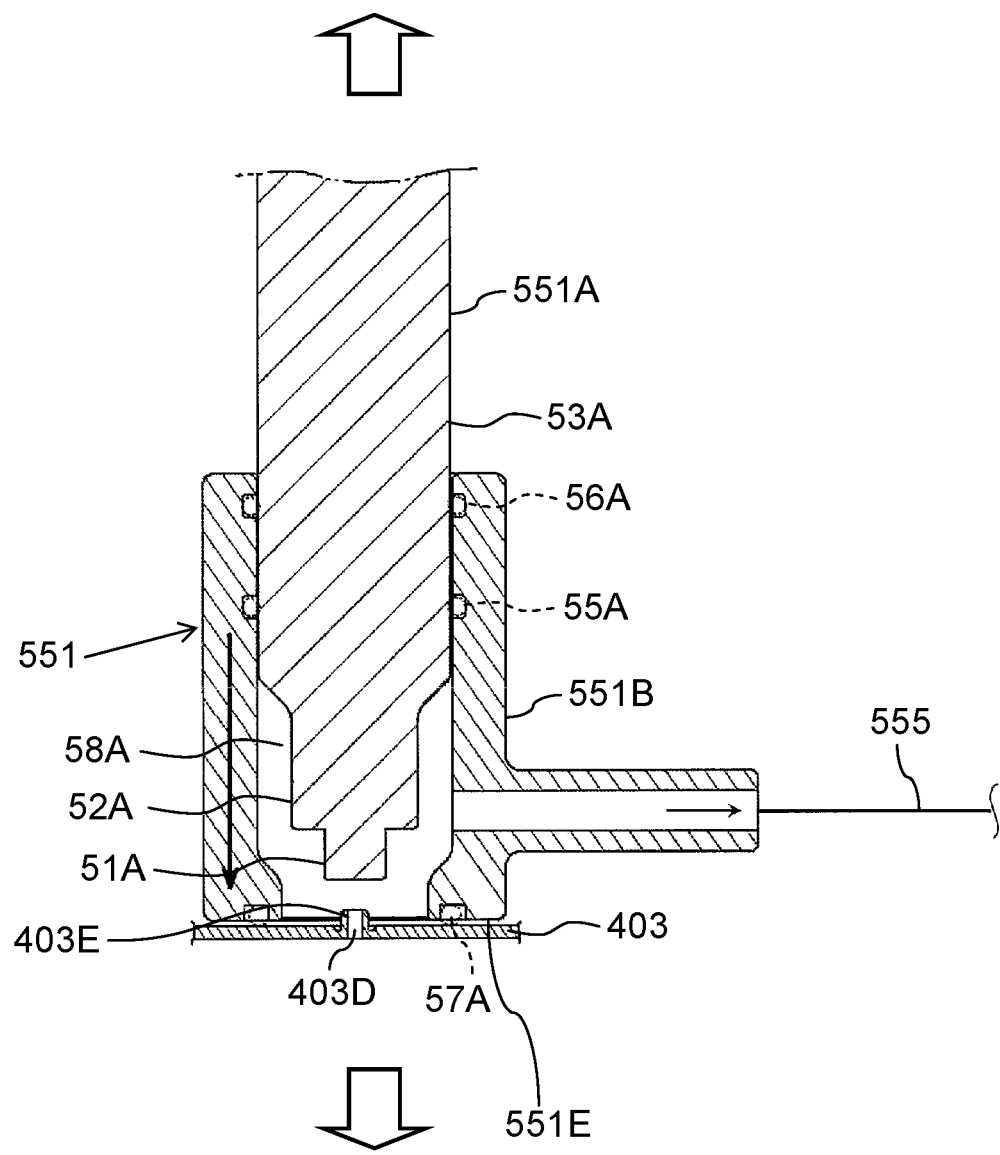
FIG. 21 is a schematic view illustrating a manufacturing step performed in step S207 (step for vacuuming interior of first member) illustrated in FIG. 20.
Figure 22:
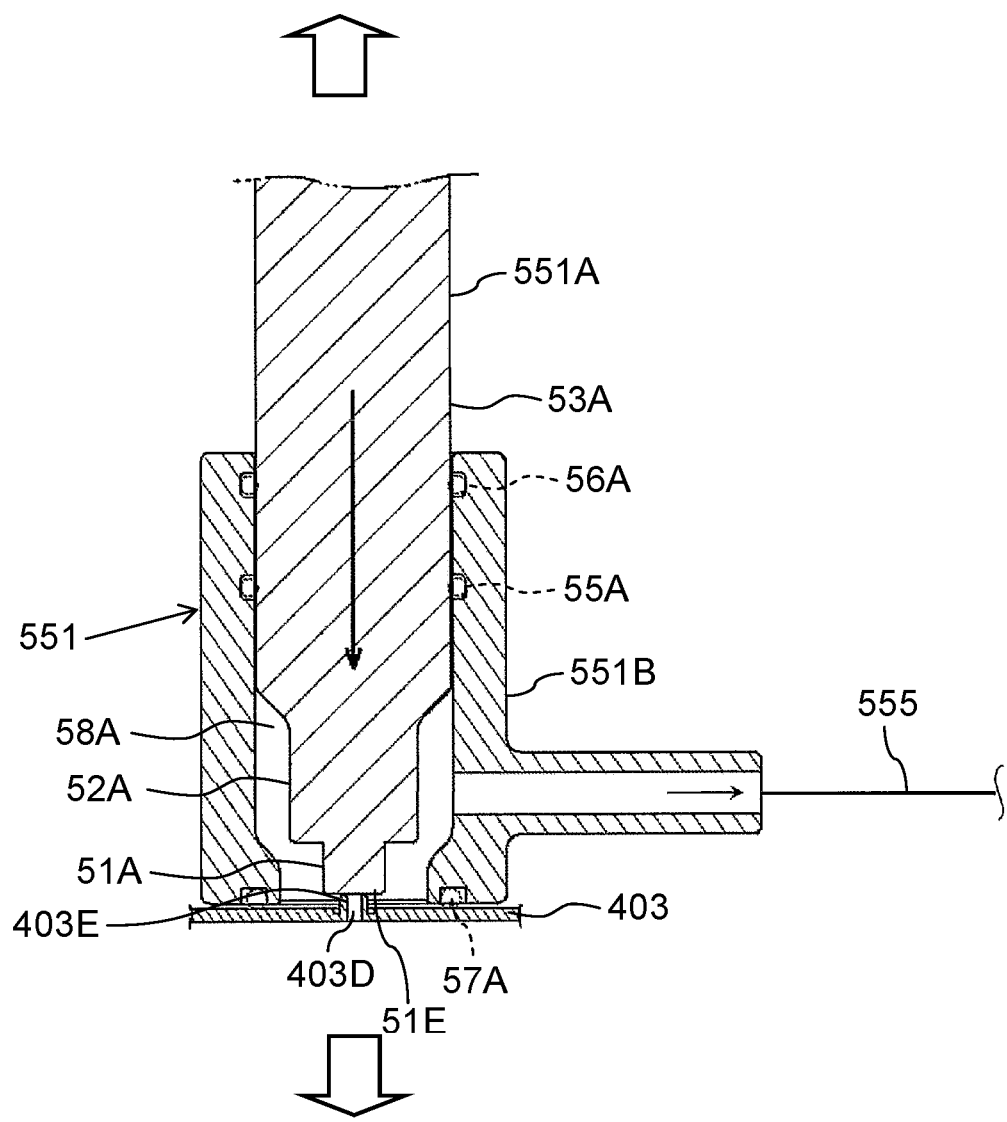
FIG. 22 is a schematic view illustrating a manufacturing step performed in step S208 (step for heating boss to close second through hole) illustrated in FIG. 20.
Figure 23:
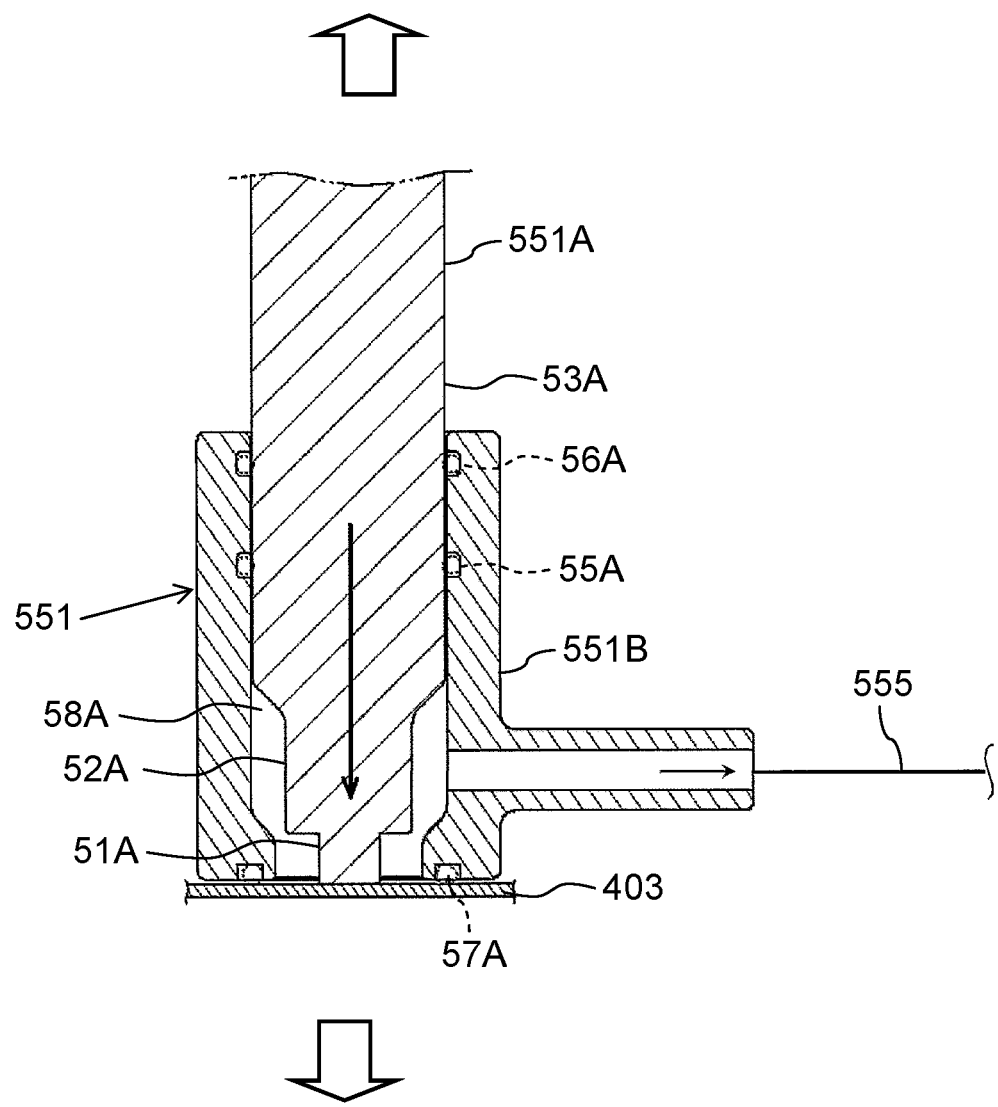
FIG. 23 is another schematic view illustrating the manufacturing step performed in step S208 (step for heating boss to close second through hole) illustrated in FIG. 20.

FIG. 20 is a flowchart illustrating respective steps of the method for operating the vacuum-sealing device (the method for manufacturing the gas barrier container) according to the second exemplary embodiment of the present disclosure. FIG. 21 is a schematic view illustrating a manufacturing step performed in step S207 (a step for vacuuming an interior of a first member) illustrated in FIG. 20. FIGS. 22 and 23 are schematic views each illustrating a manufacturing step performed in step S208 (a step for heating the boss to close the second through hole) illustrated in FIG. 20.

Concerning an up-down direction of body unit 551 of vacuum-sealing device 550A, an upward direction and a downward direction of body unit 551 correspond to an upward direction and a downward direction as viewed in each of FIGS. 21 to 23 as indicated by arrows in the respective figures.

As illustrated in FIG. 20, an operator or the like initially produces gas barrier sheets (step S201). The gas barrier sheets are manufactured in a manner similar to the manner of manufacturing gas barrier container 402 of vacuum heat insulator 101A in the first exemplary embodiment. Accordingly, detailed description of this step is not repeated herein.

The operator or the like subsequently cuts a glass plate or the like into pieces in an appropriate size, for example, to manufacture external plate 401 (step S201A). The step initially performed may be either step S201 or step S201A, or these steps may be performed in parallel.

The operator or the like subsequently processes the gas barrier sheets produced in step S201 into a shape identical to the shape of the inner surface (inner space) of inner box 403 by vacuum molding or other methods to manufacture first member 421 having a box shape and including first opening portion 421B and first through hole 421C (step S202). First through hole 421C may be formed by punching or other methods after manufacture of first member 421.

The operator or the like subsequently manufactures inner box 403 by insert molding (step S203). More specifically, the operator or the like places first member 421 in a metal mold used for manufacturing inner box 403, and pours resin such as thermoplastic resin constituting inner box 403 into the metal mold to manufacture inner box 403 including second through hole 403D and boss 403E.

For forming second through hole 403D, a metal mold including second through hole 403D may be produced in advance, and second through hole 403D and boss 403E may be formed by using the metal mold. Alternatively, second through hole 403D may be formed by punching or other methods after insert molding of inner box 403.

According to the mode of the present exemplary embodiment presented by way of example, first member 421 and inner box 403 are joined to each other by insert molding. However, first member 421 and inner box 403 may be joined (bonded) to each other by an adhesive or the like in a different adoptable mode.

The operator or the like subsequently manufactures core material 423 in a manner similar to the manner of the first exemplary embodiment (step S204).

The operator or the like subsequently places core material 423 and absorbent 424 inside first member 421, and places second member 422 in such a position as to cover the opening of first opening portion 421B (step S205). Thereafter, first opening portion 421B of first member 421 is tightly closed by second member 422 (step S206).

More specifically, first opening portion 421B is tightly closed by heating a contact portion of second member 422 in contact with flange portion 421A of first member 421 and thermocompression-bonding the contact portion of second member 422 to flange portion 421A, for example. Alternatively, first opening portion 421B may be tightly closed by bonding between second member 422 and flange portion 421A by an adhesive.

The interior of first member 421 is subsequently vacuumed by vacuum-sealing device 550A (step S207). More specifically, controller 560 drives the not-shown robot device to shift body unit 551 such that distal end face 51E of body unit 551 comes to a position above second through hole 403D of inner box 403 (first through hole 421C of first member 421 (see FIG. 19)). Thereafter, controller 560 operates driver 553 to shift external cylinder part 551B downward and bring distal end face 551E of external cylinder part 551B and inner box 403 into airtight contact with each other (see FIG. 21). Controller 560 then operates vacuum pump 552.

Accordingly, vacuuming of the interior of first member 421 is achieved via first through hole 421C, second through hole 403D, the inner space of external cylinder part 551B (exhaust space 58A), and exhaust channel 555.

Boss 403E of inner box 403 is subsequently heated to close second through hole 403D (step S208). More specifically, when the degree of vacuum of the interior of first member 421 reaches a predetermined degree, controller 560 drives driver 553 to shift body part 551A downward and bring distal end portion 51A of body part 551A into contact with boss 403E (see FIG. 22). Controller 560 then operates heater 554 to heat at least a part of body part 551A, or distal end portion 51A according to the present exemplary embodiment, and thereby heat boss 403E via distal end portion 51A.

As a result, resin constituting boss 403E is dissolved to close second through hole 403D (see FIG. 23).

Sealing member 425 is subsequently placed in such a position as to cover a portion including second through hole 403D in inner box 403 to fix sealing member 425 to second main face 403B of inner box 403 (step S209). Fixation of sealing member 425 to second main face 403B may be achieved either by heating sealing member 425 for thermal welding, or by an adhesive.

Thereafter, vacuum heat insulator 101B is manufactured (step S210). More specifically, gas barrier container 402 and external plate 401 are bonded via sheet-shaped adhesive 404 placed on a front face of gas barrier container 402 (inner box 403) to manufacture vacuum heat insulator 101B.

The configuration and method described herein can efficiently and securely seal the exhaust hole (second through hole 403D) of gas barrier container 402 which is a vacuum-sealing target, and also flatten the outer face of inner box 403. More specifically, according to vacuum-sealing device 550A and the method for operating vacuum-sealing device 550A in the present exemplary embodiment, boss 403E provided on inner box 403 of gas barrier container 402 is heated to close (bury) second through hole 403D. In this case, the exhaust hole (second through hole 403D) of gas barrier container 402 which is a vacuum-sealing target can be sealed without using an adhesive or the like. No clearance is therefore produced between the outer face of gas barrier container 402 and the inner face of inner box 403. Accordingly, sufficient gas barrier and insulation properties of heat insulation device 100B are securable.

Moreover, according to vacuum-sealing device 550A in the present exemplary embodiment, body part 551A does not include exhaust channel 54. Accordingly, the exhaust hole (second through hole 403D) can be sealed by a configuration simpler than the configuration of vacuum-sealing device 500 according to the first exemplary embodiment.

Third Exemplary Embodiment

An example of a vacuum-sealing device according to a third exemplary embodiment of the present disclosure is hereinafter described with reference to FIGS. 24 through 27.

[Configuration of Vacuum-Sealing Device]

Figure 24:
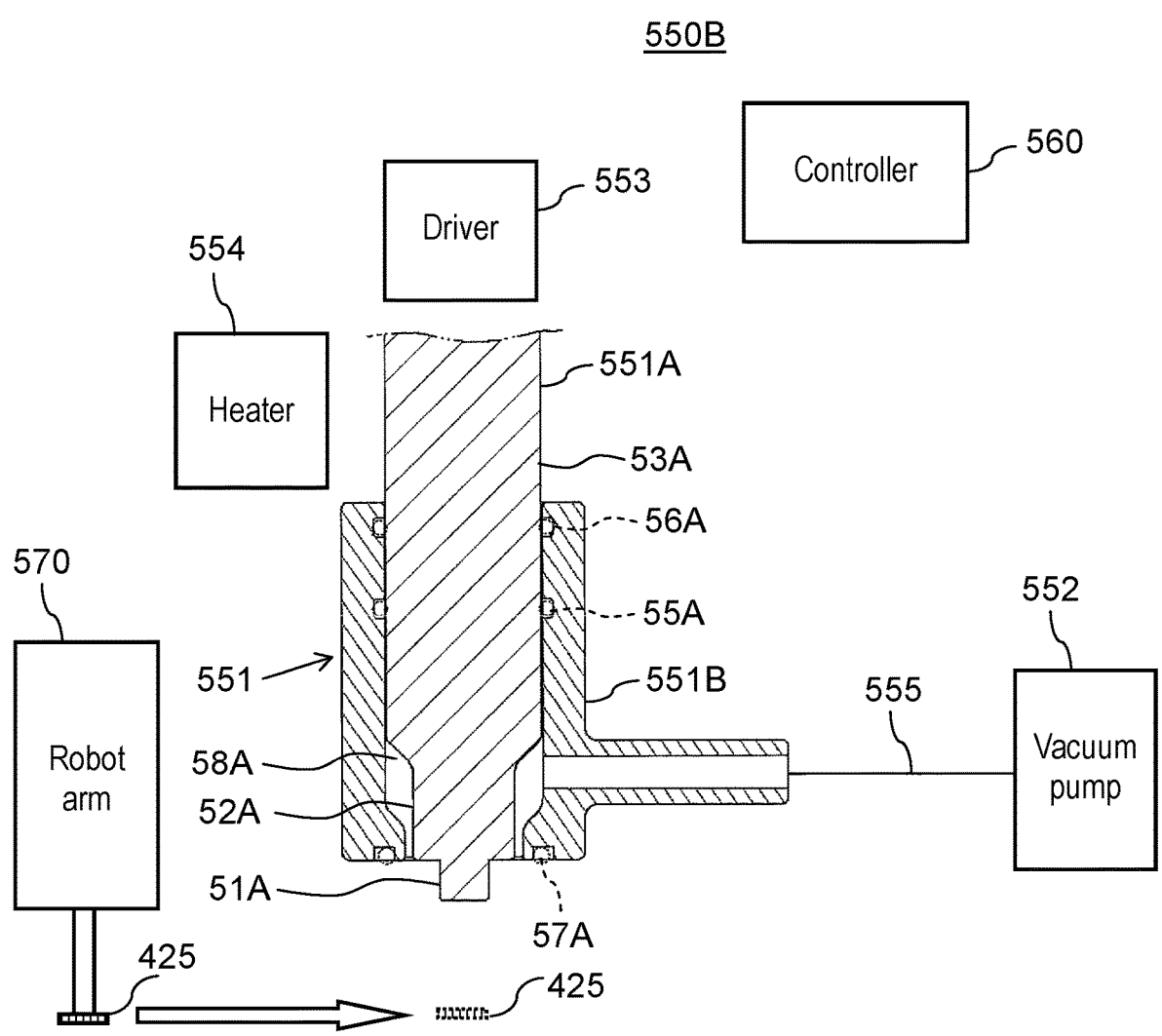
FIG. 24 is a schematic view illustrating a general configuration of a vacuum-sealing device according to a third exemplary embodiment of the present disclosure.

FIG. 24 is a schematic view illustrating a general configuration of a vacuum-sealing device according to the third exemplary embodiment of the present disclosure.

As illustrated in FIG. 24, a basic configuration of vacuum-sealing device 550B according to the third exemplary embodiment of the present disclosure is similar to the basic configuration of vacuum-sealing device 550A according to the second exemplary embodiment. However, vacuum-sealing device 550B is different from vacuum-sealing device 550A in that robot arm 570 is further provided. Any modes of robot arm 570 may be adopted as long as sealing member 425 can be placed at a circumferential edge of first through hole 421C of first member 421 by robot arm 570. Known robot arms may be adopted.

According to the mode of the present exemplary embodiment presented by way of example, vacuum-sealing device 550B includes robot arm 570. However, the present disclosure is not limited to this mode. For example, robot arm 570 may be included not in vacuum-sealing device 550B but in a device different from vacuum-sealing device 550B in a different adoptable mode. Moreover, when an operator places sealing member 425 at the circumferential edge of first through hole 421C of first member 421, robot arm 570 included in vacuum-sealing device 550B may be eliminated in a different adoptable mode.

[Method for Operating Vacuum-Sealing Device]

Described now with reference to FIGS. 24 to 27 is a method for operating vacuum-sealing device 550B (a method for manufacturing a gas barrier container) according to the third exemplary embodiment of the present disclosure. For example, vacuum-sealing device 550B according to the present exemplary embodiment manufactures gas barrier container 402 described in the first exemplary embodiment.

Figure 25:
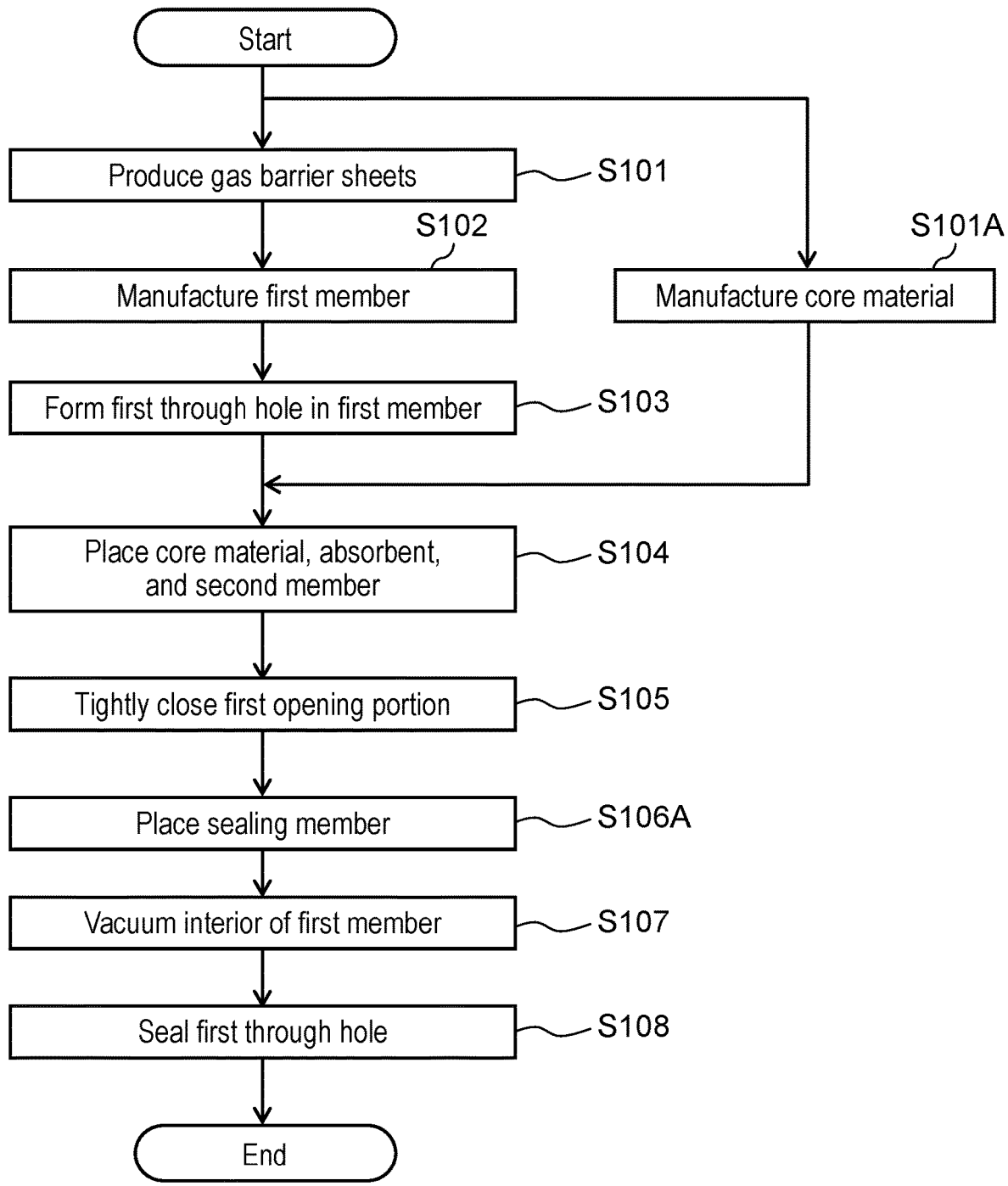
FIG. 25 is a flowchart illustrating respective steps of a method for operating the vacuum-sealing device (method for manufacturing gas barrier container) according to the third exemplary embodiment of the present disclosure.
Figure 26:
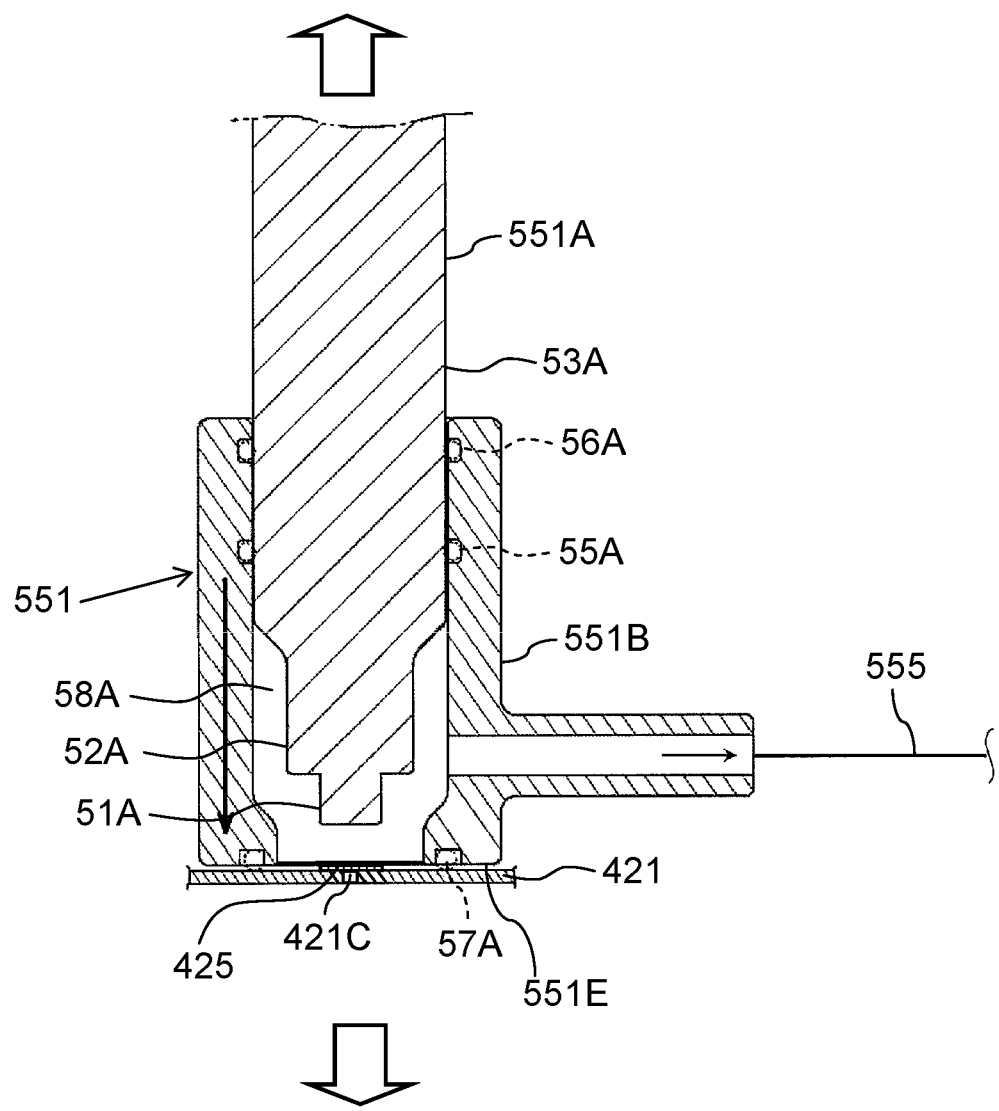
FIG. 26 is a schematic view illustrating manufacturing steps performed in step S106A (step for placing sealing member) and step S107 (step for vacuuming interior of first member) illustrated in FIG. 25.
Figure 27:
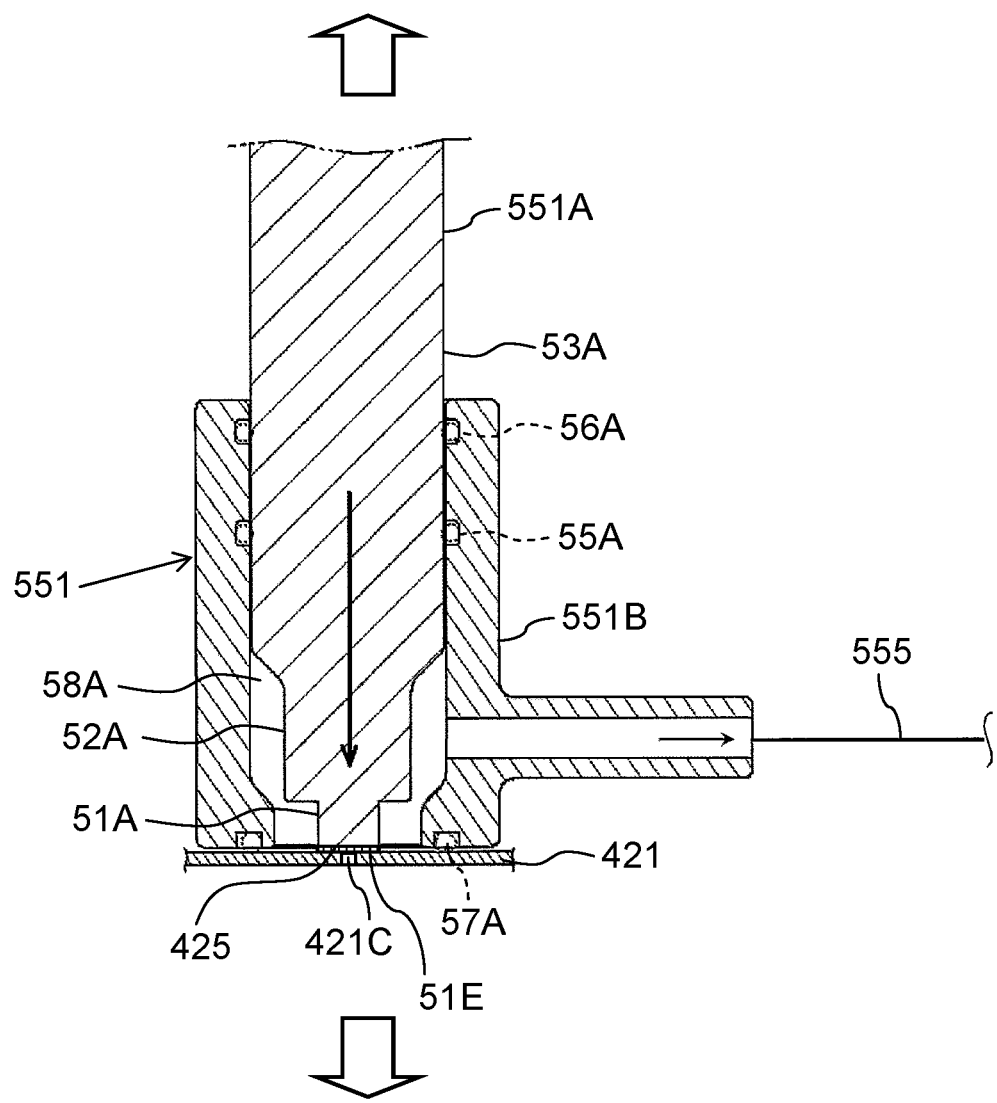
FIG. 27 is a schematic view illustrating a manufacturing step performed in step S108 (step for sealing first through hole) illustrated in FIG. 25.

FIG. 25 is a flowchart illustrating respective steps of the method for operating the vacuum-sealing device (the method for manufacturing the gas barrier container) according to the third exemplary embodiment of the present disclosure. FIG. 26 is a schematic view illustrating manufacturing steps performed in step S106A (a step for placing a sealing member) and step S107 (a step for vacuuming an interior of first member) illustrated in FIG. 25. FIG. 27 is a schematic view illustrating a manufacturing step performed in step S108 (a step for sealing a first through hole) illustrated in FIG. 25. Concerning an up-down direction of body unit 551 of vacuum-sealing device 550B, an upward direction and a downward direction of body unit 551 correspond to an upward direction and a downward direction as viewed in each of FIGS. 26 and 27 as indicated by arrows in the respective figures.

As illustrated in FIG. 25, a basic operation of the method for operating vacuum-sealing device 550B (a method for manufacturing gas barrier container 402) according to the present exemplary embodiment is similar to the basic operation of the method for operating vacuum-sealing device 500 according to the first exemplary embodiment. However, the method of the present exemplary embodiment is different from the method of the first exemplary embodiment in that step S106A is executed instead of step S106 performed in the first exemplary embodiment, and that specific operation details in steps S107 and S108 are different from those steps in the first exemplary embodiment. More specifically, according to the method for operating vacuum-sealing device 550B in the present exemplary embodiment, operations similar to the operations in steps S101 to S105 in the method for operating vacuum-sealing device 500 of the first exemplary embodiment are executed. However, operations in steps S106 to S108 are different from the corresponding operations in the first exemplary embodiment.

In step S106A of the method for operating vacuum-sealing device 550B according to the present exemplary embodiment, sealing member 425 is placed on the outer face of first member 421 (an upper face of first member 421 in FIG. 26). More specifically, controller 560 drives robot arm 570 (see FIG. 24) to place sealing member 425 on the outer face of first member 421 (the upper face of first member 421 in FIG. 26).

Sealing member 425 is configured, by using an appropriate means, not to interfere with vacuuming of the interior of first member 421, and to cover the opening of first through hole 421C at the time of sealing of first through hole 421C of first member 421.

For example, sealing member 425 in such a size as not to interfere with vacuuming or cause other problems may be experimentally determined based on exhaust speed, exhaust quantity, and exhaust time (operation time) of vacuum pump 552, a volume of exhaust space 58A, and other conditions. A clearance communicating with first through hole 421C may be further formed between the lower face of sealing member 425 and the upper face of first member 421 by curving the main face of sealing member 425 or bending a part of sealing member 425, for example. Moreover, a part of sealing member 425 may be fixed to the upper face of first member 421 via an adhesive provided on a part of the lower face of sealing member 425.

Subsequently, vacuum-sealing device 550B vacuums the interior of first member 421 (step S107). More specifically, controller 560 drives a robot device (not shown) to shift body unit 551 such that distal end face 51E of body unit 551 comes to a position above first through hole 421C. Thereafter, controller 560 operates driver 553 to shift external cylinder part 551B downward and bring distal end face 551E of external cylinder part 551B and first member 421 into contact with each other such that distal end 551E of external cylinder part 551B can cover first through hole 421C (see FIG. 26). Controller 560 then operates vacuum pump 552.

Accordingly, vacuuming of the interior of first member 421 is achieved by connection between the interior of first member 421 and vacuum pump 552 via first through hole 421C, the inner space of external cylinder part 551B (exhaust space 58A), and exhaust channel 555.

First through hole 421C is subsequently sealed by sealing member 425 (step S108). More specifically, when the degree of vacuum of the interior of first member 421 reaches a predetermined degree, controller 560 drives driver 553, and shifts body part 551A downward to bring distal end face 51E of body part 551A (distal end portion 51A) into contact with sealing member 425. Controller 560 then operates heater 554 to heat at least a part of body part 551A, or distal end portion 51A according to the present exemplary embodiment, and thereby heat sealing member 425 via distal end portion 51A and weld sealing member 425 to first member 421 for seal of first through hole 421C by sealing member 425 (see FIG. 27).

According to the foregoing configuration and method of vacuum-sealing device 550B in the present exemplary embodiment, sealing member 425 is placed on the outer face of first member 421. Accordingly, reduction of manufacturing costs of vacuum-sealing device 550B is achievable without a need of a means for fixing sealing member 425 to distal end portion 51A of body unit 501, such as an adhesive.

When sealing member 425 is fixed to distal end portion 51A of body unit 551 via an adhesive, the adhesive remains on the outer face of sealing member 425 after seal of first through hole 421C by sealing member 425. In this case, a clearance is produced between the outer face of gas barrier container 402 and the inner face of inner box 403 by the remaining adhesive, in which condition gas barrier and heat insulation properties of heat insulation device 100A may deteriorate.

According to vacuum-sealing device 550B in the present exemplary embodiment, however, the adhesive does not remain on the outer face of sealing member 425 after seal of first through hole 421C by sealing member 425.

In this case, no clearance is produced between the outer face of gas barrier container 402 and the inner face of inner box 403. Accordingly, a heat insulation wall which includes vacuum heat insulator 101B including gas barrier container 402 manufactured by vacuum-sealing device 550B in the present exemplary embodiment secures sufficient gas barrier and heat insulation properties. Heat insulation device 100A manufactured by vacuum-sealing device 550B according to the present exemplary embodiment therefore includes a heat insulation wall securing sufficient gas barrier and heat insulation properties.

Moreover, according to vacuum-sealing device 550B in the present exemplary embodiment, body part 551A does not include exhaust channel 54. Accordingly, first through hole 421C can be sealed by a configuration simpler than the configuration of vacuum-sealing device 500 according to the first exemplary embodiment.

Many improvements and different exemplary embodiments of the present disclosure may easily occur to those skilled in the art based on the description presented herein. Accordingly, the description herein should be interpreted only as a specific example, and presented only for purposes of teachings for practicing best modes of the present disclosure by those skilled in the art. Details of structures and/or functions can be substantially changed without departing from subject matters of the present disclosure. In addition, various modes can be practiced by using appropriate combinations of a plurality of constituent elements disclosed in the respective exemplary embodiments presented herein.

INDUSTRIAL APPLICABILITY

The present disclosure provides a vacuum-sealing device and a method for operating the vacuum-sealing device, the device and the method being capable of securing sufficient gas barrier and heat insulation properties, and also reducing manufacturing costs by sealing an exhaust hole formed in a vacuum heat insulator. The vacuum-sealing device and the method for operating the vacuum-sealing device provided according to the present disclosure are therefore applicable to various purposes of use requiring vacuum sealing, such as manufacture of a vacuum heat insulator.

REFERENCE MARKS IN THE DRAWINGS

2: refrigerator body
2A: recess
2B: recess
3: refrigerating compartment door
4A: ice-making compartment door
4B: first freezing compartment door
5: vegetable compartment door
6: second freezing compartment door
8: compressor
9: evaporator
10: cooling channel
11: refrigerating compartment
12: ice-making compartment
13: vegetable compartment
14: second freezing compartment
15: partition wall
16: partition wall
17: partition wall
18: cooling compartment
19: cooling compartment wall body
20: evaporating dish
21: first resin layer
22: second resin layer
23: gas barrier layer
51: distal end portion
51A: distal end portion
51E: distal end face
52: intermediate portion
52A: intermediate portion
53: rear end portion
53A: rear end portion
54: exhaust channel
54A: opening
55: sealing member
55A: sealing member
57: sealing member
57A: sealing member
58: exhaust space
58A: exhaust space
100: heat insulation device
101A, 101B: vacuum heat insulator
201: first member
210: through hole
401: external plate
402: gas barrier container (container)
403: inner box
403A: first main face
403B: second main face
403C: second opening portion
403D: second through hole (exhaust hole)
403E: boss
403F: gasket groove
404: adhesive
405: adhesive
421: first member
421A: flange portion
421B: first opening portion
421C: first through hole (exhaust hole)
422: second member
423: core material
424: absorbent
425: sealing member
441: gasket
442: frame
443: screw
500: vacuum-sealing device
501: vacuum-sealing device body unit (body unit)
501A: body part
501B: external cylinder part
501E: distal end face
502: vacuum pump
503: driver
504: heater
505: second exhaust channel
506: first exhaust channel
506A: opening
507: openable valve
510: controller 550A, 550B: vacuum-sealing device
551: vacuum-sealing device body unit (body unit)
551A: body part
551B: external cylinder part
551E: distal end face
552: vacuum pump
553: driver
554: heater
555: exhaust channel
560: controller

The invention claimed is:

1. A vacuum-sealing device configured to seal an exhaust hole formed in a container that is subject to vacuum-sealing, the exhaust hole being sealed by dissolving a boss provided at a circumferential edge of the exhaust hole, the vacuum-sealing device comprising:
 a body unit that includes an external cylinder part and a body part, the external cylinder part including a distal end face that is brought into contact with an outer face of the container to cover the exhaust hole, and the body part being provided within the external cylinder part and movable forward and backward along an axial center of the external cylinder part;
 a driver that moves the external cylinder part and the body part forward and backward in the direction of the axial center of the external cylinder part;
 a heater that heats at least a part of the body part; and
 a controller, wherein
 the body part has a substantially cylindrical shape being free from an exhaust channel, and has a distal end portion, an intermediate portion and a rear end portion,
 a cross-sectional area of the intermediate portion is larger than a cross-sectional area of the distal end portion, a cross-sectional area of the rear end portion is larger than the cross-sectional area of the distal end portion,
 the external cylinder part is configured such that an inner circumferential face of the external cylinder part slides on an outer circumferential face of the rear end portion,
 an exhaust space communicating with the distal end face of the external cylinder part is formed between an outer circumferential face of the distal end portion of the body part and the inner circumferential face of the external cylinder part, and
 a vacuum pump connected to the exhaust space is further provided,
 the controller operates the driver to shift the external cylinder part toward the container and bring the distal end face of the external cylinder part into contact with the outer face of the container such that the distal end face of the external cylinder part covers the exhaust hole of the container,
 the controller operates the vacuum pump to exhaust air from an interior of the container via the exhaust space,
 the controller operates the driver to move the body part such that the distal end portion of the body part is brought into contact with the boss of the container, and
 the controller operates the heater to heat the distal end portion of the body part and dissolve the boss for seal of the exhaust hole of the container.

2. A vacuum-sealing device that seals an exhaust hole by a sealing member, the exhaust hole being formed in a container that is subject to vacuum-sealing, the vacuum-sealing device comprising:
 a body unit that includes an external cylinder part and a body part, the external cylinder part including a distal end face that is brought into contact with an outer face of the container to cover the exhaust hole, and the body part being provided within the external cylinder part and movable forward and backward along an axial center of the external cylinder part;
 a driver that moves the external cylinder part and the body part forward and backward in the direction of extension of the axial center of the external cylinder part; and
 a heater that heats at least a part of the body part; and
 a controller, wherein
 the body part has a substantially cylindrical shape being free from an exhaust channel, and has a distal end portion, an intermediate portion and a rear end portion,
 a cross-sectional area of the intermediate portion is larger than a cross-sectional area of the distal end portion, a cross-sectional area of the rear end portion is larger than the cross-sectional area of the distal end portion,
 the external cylinder part is configured such that an inner circumferential face of the external cylinder part slides on an outer circumferential face of the rear end portion,
 the distal end portion is heated by the heater,
 an exhaust space communicating with the distal end face of the external cylinder part is formed between an outer circumferential face of the distal end portion of the body part and the inner circumferential face of the external cylinder part, and
 a vacuum pump connected to the exhaust space is further provided,
 the controller operates the driver to shift the external cylinder part toward the container and bring the distal end face of the external cylinder part into contact with the outer face of the container that carries the sealing member to cover the exhaust hole,
 the controller operates the vacuum pump to exhaust air from an interior of the container via the exhaust space,
 the controller operates the driver to move the body part such that the distal end portion of the body part presses the sealing member, and
 the controller operates the heater to heat the distal end portion of the body part and weld the sealing member to a circumferential edge of the exhaust hole formed in the container.

3. A method for operating a vacuum-sealing device configured to seal an exhaust hole formed in a container, the container including the exhaust hole and a boss provided at a circumferential edge of the exhaust hole, the exhaust hole being sealed by dissolving the boss,
 wherein the vacuum-sealing device includes:
  a body unit that includes an external cylinder part and a body part, the external cylinder part including a distal end face that is brought into contact with an outer face of the container to cover the exhaust hole, and the body part being provided within the external cylinder part and movable forward and backward along an axial center of the external cylinder part;
  a driver that moves the external cylinder part and the body part forward and backward in the direction of extension of the axial center of the external cylinder part;
  a heater that heats at least a part of the body part; and
  a vacuum pump connected to an exhaust space,
 the body part has a substantially cylindrical shape being free from an exhaust channel, and has a distal end portion, an intermediate portion and a rear end portion,
 a cross-sectional area of the intermediate portion is larger than a cross-sectional area of the distal end portion, a cross-sectional area of the rear end portion is larger than the cross-sectional area of the distal end portion, the external cylinder part is configured such that an inner circumferential face of the external cylinder part slides on an outer circumferential face of the rear end portion, the exhaust space communicating with the distal end face of the external cylinder part is formed between an outer circumferential face of the distal end portion of the body part and the inner circumferential face of the external cylinder part, and the method for operating the vacuum-sealing device comprising:

operating the driver to shift the external cylinder part toward the container and bring the distal end face of the external cylinder part into contact with the outer face of the container such that the distal end face of the external cylinder part covers the exhaust hole of the container;

operating the vacuum pump to exhaust air from an interior of the container via the exhaust space;

operating the driver to move the body part such that the distal end portion of the body part is brought into contact with the boss of the container and the inner circumferential face of the external cylinder part slides on the outer circumferential face of the rear end portion; and operating the heater to heat the distal end portion of the body part and dissolve the boss for seal of the exhaust hole of the container.

4. A method for operating a vacuum-sealing device that seals an exhaust hole by a sealing member, the exhaust hole being formed in a container that is subject to vacuum-sealing, wherein the vacuum-sealing device includes:

a body unit that includes an external cylinder part and a body part, the external cylinder part including a distal end face that is brought into contact with an outer face of the container to cover the exhaust hole, and the body part being provided within the external cylinder part and movable forward and backward along an axial center of the external cylinder part;

a driver that moves the external cylinder part and the body part forward and backward in the direction of the axial center of the external cylinder part;

a heater that heats at least a part of the body part; and a vacuum pump connected to an exhaust space, the body part has a substantially cylindrical shape being free from an exhaust channel, and has a distal end portion, an intermediate portion and a rear end portion, a cross-sectional area of the intermediate portion is larger than a cross-sectional area of the distal end portion, a cross-sectional area of the rear end portion is larger than the cross-sectional area of the distal end portion, the external cylinder part is configured such that an inner circumferential face of the external cylinder part slides on an outer circumferential face of the rear end portion, the exhaust space communicating with the distal end face of the external cylinder part is formed between an outer circumferential face of the distal end portion of the body part and the inner circumferential face of the external cylinder part, and the method for operating the vacuum-sealing device comprising:

placing the sealing member at a circumferential edge of the exhaust hole of the container to cover the exhaust hole;

operating the driver to shift the external cylinder part toward the container and bring the distal end face of the external cylinder part into contact with the outer face of the container such that the distal end face of the external cylinder part covers the exhaust hole of the container;

operating the vacuum pump to exhaust air from an interior of the container via the exhaust space;

operating the driver to move the body part such that the distal end portion of the body part presses the sealing member and the inner circumferential face of the external cylinder part slides on the outer circumferential face of the rear end portion; and operating the heater to heat the distal end portion of the body part and weld the sealing member to a circumferential edge of the exhaust hole formed in the container.

\* \* \* \* \*